United States Patent [19]
Benson

[11] Patent Number: 5,307,492
[45] Date of Patent: Apr. 26, 1994

[54] MAPPING ASSEMBLY LANGUAGE ARGUMENT LIST REFERENCES IN TRANSLATING CODE FOR DIFFERENT MACHINE ARCHITECTURES

[75] Inventor: Thomas R. Benson, Hollis, N.H.

[73] Assignee: Digital Equipment Corporation, Maynard, Mass.

[21] Appl. No.: 666,085

[22] Filed: Mar. 7, 1991

[51] Int. Cl.5 .............................................. G06F 9/44
[52] U.S. Cl. .................................. 395/700; 395/650; 364/280.4; 364/280.5
[58] Field of Search ...................... 395/700, 650, 375; 364/400

[56] References Cited

U.S. PATENT DOCUMENTS

| | | | |
|---|---|---|---|
| 4,167,778 | 9/1979 | Sipple ................................... | 395/375 |
| 4,642,764 | 2/1987 | Auslander et al. ................... | 395/700 |
| 4,667,290 | 5/1987 | Goss et al. ........................... | 395/700 |
| 4,802,091 | 1/1989 | Cocke et al. ......................... | 395/700 |
| 5,142,681 | 8/1992 | Driscoll et al. ...................... | 395/700 |
| 5,159,687 | 10/1992 | Richburg ............................. | 395/700 |

FOREIGN PATENT DOCUMENTS 0372835 6/1990 European Pat. Off. .
WO90/1738 2/1990 PCT Int'l Appl. .

OTHER PUBLICATIONS

Banning, "The XDOS Binary Code Conversion System," COMPCON 89, 27 Feb. 1989, San Francisco, pp. 282–287.

Hunter et al, "DOS at RISC", Byte Magazine, vol. 14, No. 12, No. 1989, pp. 361–368.

*Primary Examiner*—Kevin A. Kriess
*Assistant Examiner*—Kevin Spivak
*Attorney, Agent, or Firm*—Arnold, White & Durkee

[57] ABSTRACT

A code translator, constructed similar to a compiler, accepts as an input to be translated the assembly code written for one architecture (e.g., VAX), and produces as an output object code for a different machine architecture (e.g., RISC). The input code is converted into an intermediate language, and a flow graph is constructed. The flow graph is referenced by a flow analyzer for recognizing certain architecture-specific and calling standard-specific coding practices or idioms that cannot be automatically converted, particularly relating to stack usage, register usage, condition codes, and passing arguments for procedure calls. By tracking stack usage within routines, the compiler can distinguish up-level stack and return address references from valid local references. Also, it can inform the user of stack misalignment, which has a severe performance penalty, and can detect code segments where different flow paths may result in different stack depths at runtime, which may indicate a source code error. Register usage is likewise tracked to determine which registers are destroyed by a routine, and generate routine prologue and epilogue code which performs register saves, as well as provide register "hints" to aid the user in adding an entry point declaration or documentation for the routine. The usage of condition codes is likewise tracked, by a backward walk through the flow graph, so that code to fabricate needed values is generated. In addition, all argument pointer based memory references in the input code is tracked to determine how the same argument reference may be made in the target environment.

16 Claims, 12 Drawing Sheets

ORIGINAL ASSEMBLY CODE: ADDL 3  #1,J,I
RISC CODE:
```
LOAD    RN, J
ADDI    RN, #1
STORE   RN, I
```
INTERMEDIATE LANGUAGE:
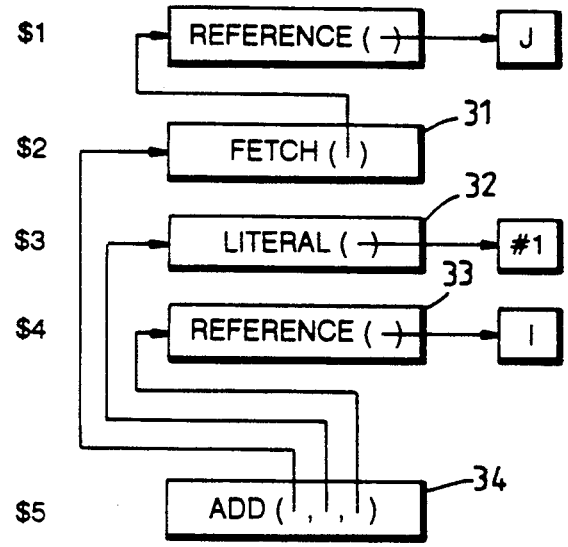
Fig. 3
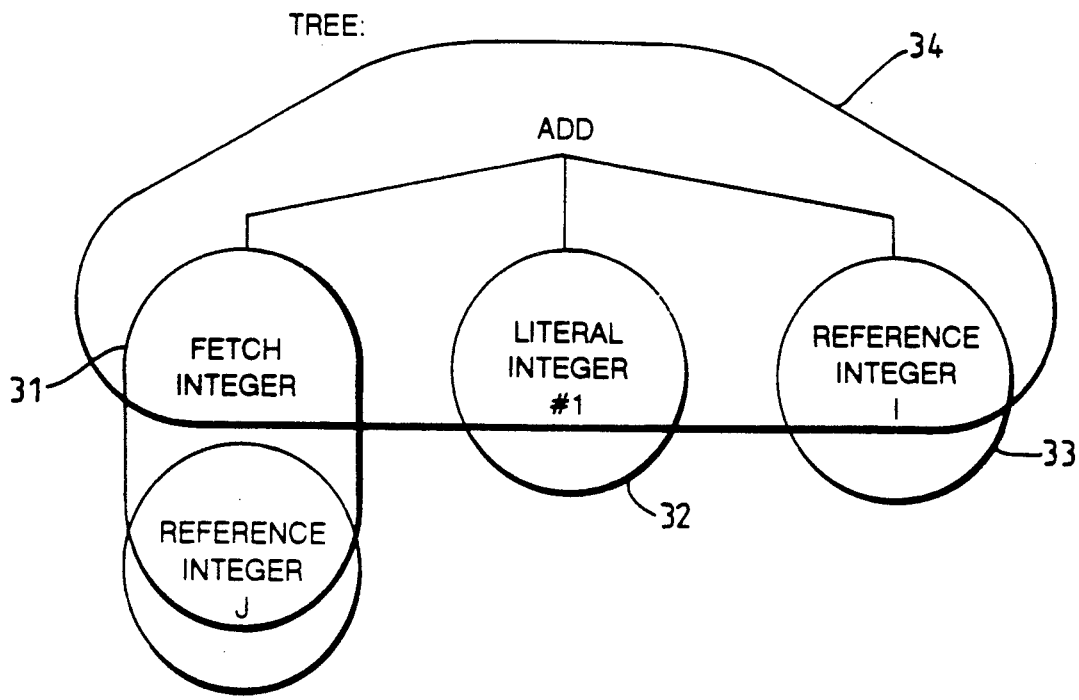

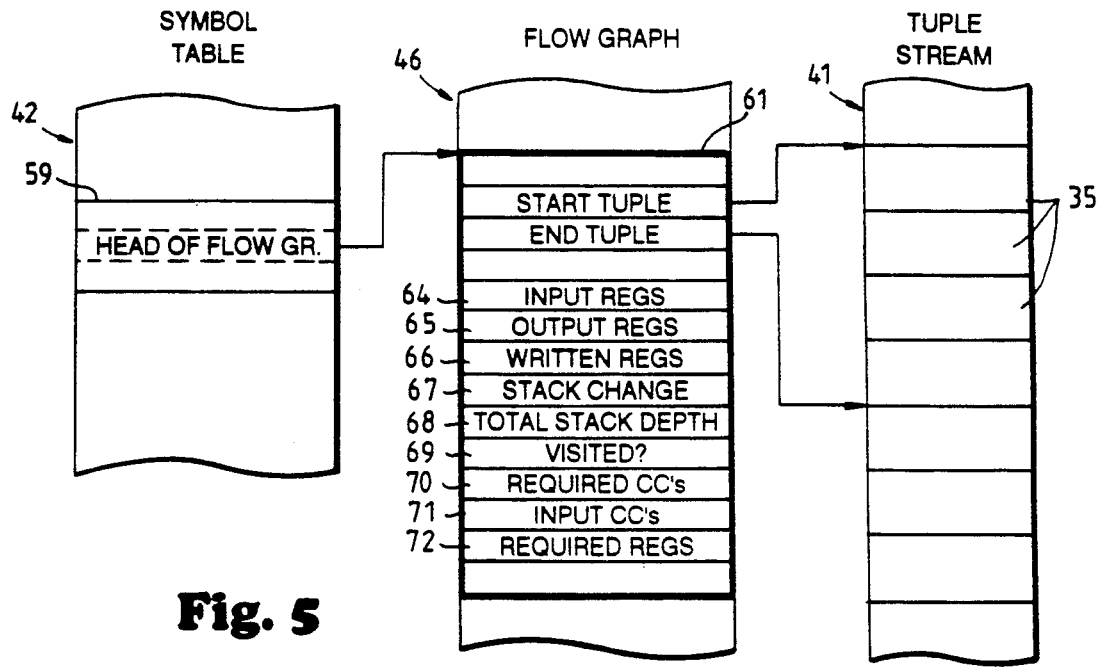
Fig. 5
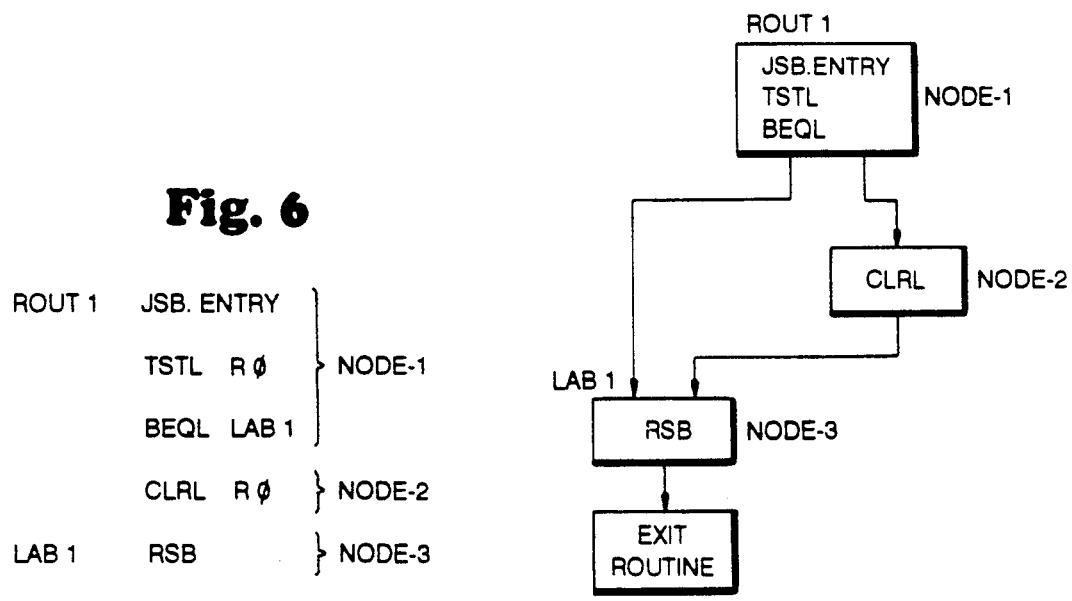
Fig. 6
Fig. 7

| TUPLE NO. | | | | |
|---|---|---|---|---|
| $22 | | .JSB_ENTRY | | } NODE 4 |
| $23 | | PUSHL | R Ø | } NODE 5 |
| $24 | | BEQL | LAB 2 | |
| $25 | | ADDL 3 | R 1, R 2, -(SP) | } NODE 6 |
| $26 | | BLSS | LAB 1 | |
| $27 | | MOVL | (SP)+, R 3 | } NODE 7 |
| $28 | | BRB | LAB 2 | |
| $29 | LAB 1: | ADDL 2 | #4, SP | } NODE 8 |
| $30 | LAB 2: | POPL | R5 | } NODE 9 |
| $31 | | RSB | | |

MAPPING ASSEMBLY LANGUAGE ARGUMENT LIST REFERENCES IN TRANSLATING CODE FOR DIFFERENT MACHINE ARCHITECTURES

RELATED CASES

The application discloses subject matter also disclosed in the following copending applications filed herewith and assigned to the assignee of the present invention:

Ser. No. 666,083, filed Mar. 7, 1991, by Thomas R. Benson, for "USE OF STACK DEPTH TO IDENTIFY ARCHITECTURE AND CALLING STANDARD DEPENDENCIES IN MACHINE CODE";

Ser. No. 666,084, filed Mar. 7, 1991, by Thomas R. Benson, for "REGISTER USAGE TRACKING IN TRANLATING CODE FOR DIFFERENT MACHINE ARCHITECTURES";

Ser. No. 666,082, filed Mar. 7, 1991, by Thomas R. Benson, for "TRACKING CONDITION CODES IN TRANLATING CODE FOR DIFFERENT MACHINE ARCHITECTURES".

BACKGROUND OF THE INVENTION

This invention relates to programs for digital computers, and more particularly to code translation for conversion of instruction code which was written for one computer architecture to code for a more advanced architecture.

Computer architecture is the definition of the basic structure of a computer from the standpoint of what exactly can be performed by code written for this computer. Ordinarily, architecture is defined by such facts as the number of registers in the CPU, their size and content, the logic operations performed by the ALU, shifter, and the like, the addressing modes available, data types supported, memory management functions, etc. Usually, the architectural definition is expressed as an instruction set, and related elaboration.

As the technology used in constructing computers evolves, so does computer architecture. Semiconductor technology has served to make all structural features of a computer faster, less costly, smaller, lower in power dissipation, and more reliable. In view of such changes in the economics and performance of the computer hardware, it is necessary to make corresponding changes in architecture to take full advantage of existing hardware technology. For example, the CPU data paths have evolved from 16-bit, to 32-bit, to 64-bit. And, as memory has become cheaper, the addressing range has been greatly extended. A major departure in computer architecture, however, has been the retreat from adding more complex and powerful instructions, and instead architectures with reduced instruction sets have been shown to provide performance advantages.

Complex instruction set or CISC processors are characterized by having a large number of instructions in their instruction set, often including memory-to-memory instructions with complex memory accessing modes. The instructions are usually of variable length, with simple instructions being only perhaps one byte in length, but the length ranging up to dozens of bytes. The VAX TM instruction set is a primary example of CISC and employs instructions having one to two byte /pcodes plus from zero to six operand specifiers, where each operand specifier is from one byte to many bytes in length. The size of the operand specifier depends upon the addressing mode, size of displacement (byte, word or longword), etc. The first byte of the operand specifier describes the addressing mode for that operand, while the opcode defines the number of operands: one, two or three. When the opcode itself is decoded, however, the total length of the instruction is not yet known to the processor because the operand specifiers have not yet been decoded. Another characteristic of processors of the VAX type is the use of byte or byte string memory references, in addition to quadword or longword references; that is, a memory reference may be of a length variable from one byte to multiple words, including unaligned byte references.

Reduced instruction set or RISC processors are characterized by a smaller number of instructions which are simple to decode, and by requiring that all arithmetic/logic operations be performed register-to-register. Another feature is that of allowing no complex memory accesses; all memory accesses are register load/store operations, and there are a small number of relatively simple addressing modes, i.e., only a few ways of specifying operand addresses. Instructions are of only one length, and memory accesses are of a standard data width, usually aligned. Instruction execution is of the direct hardwired type, as distinct from microcoding. There is a fixed instruction cycle time, and the instructions are defined to be relatively simple so that they all execute in one short cycle (on average, since pipelining will spread the actual execution over several cycles).

One advantage of CISC processors is in writing source code. The variety of powerful CISC instructions, memory accessing modes and data types should result in more work being done for each line of code (actually, compilers do not produce code taking full advantage of this). However, whatever gain in compactness of source code for a CISC processor is accomplished at the expense of execution time. Particularly as pipelining of instruction execution has become necessary to achieve performance levels demanded of systems presently, the data or state dependencies of successive instructions, and the vast differences in memory access time vs. machine cycle time, produce excessive stalls and exceptions, slowing execution. The advantage of a RISC processor is the speed of execution of code, but the disadvantage is that less is accomplished by each line of code, and the code to accomplish a given task is much more lengthy. One line of VAX code can accomplish the same as many lines of RISC code.

When CPUs were much faster than memory, it was advantageous to do more work per instruction, because otherwise the CPU would always be waiting for the memory to deliver instructions—this factor lead to more complex instructions that encapsulated what would be otherwise implemented as subroutines. When CPU and memory speed became more balanced, a simple approach such as that of the RISC concepts became more feasible, assuming the memory system is able to deliver one instruction and some data in each cycle. Hierarchical memory techniques, as well as faster access cycles, provide these faster memory speeds. Another factor that has influenced the CISC vs. RISC choise is the change in relative cost of off-chip vs. on-chip interconnection resulting from VLSI construction of CPUs. Construction on chips instead of boards changes the economics—first it pays to make the architecture simple enough to be on one chip, then more on-chip memory is possible (and needed) to avoid going off-chip for memory references. A further factor in the comparison is that adding more complex instructions and addressing modes as in a CISC solution complicates (thus slows down) stages of the instruction execution process. The complex function might make the function execute faster than an equivalent sequence of simple instructions, but it can lengthen the instruction cycle time, making all instructions execute slower; thus an added function must increase the overall performance enough to compensate for the decrease in the instruction execution rate.

The performance advantages of RISC processors, taking into account these and other factors, is considered to outweigh the shortcomings, and, were it not for the existing software base, most new processors would probably be designed using RISC features. In order for software base, including operating systems and applications programs, to build up to a high level so that potential and existing users will have the advantages of making use of the product of the best available programming talent, a computer architecture must exhibit a substantial market share for a long period of time. If a new architecture was adopted every time the technology advances allowed it, the software base would never reach a viable level. This issue is partly alleviated by writing code in high level languages; a program written in C should be able to be compiled to run on a VAX/VMS operating system, or a UNIX operating system, or on MS/DOS, and used on various architectures supported by these operating systems. For performance reasons, however, a significant amount of code is written in assembly language, particularly operating systems, and critical parts of applications programs. Assembly language programs are architecture-dependent.

Business enterprises (computer users, as well as hardware and software producers) have invested many years of operating background, including operator training as well as the cost of the code itself, in operating systems, applications programs and data structures using the CISC-type processors which were the most widely used in the past ten or fifteen years. The expense and disruption of /perations to rewrite the code and data structures by hand to accommodate a new processor architecture may not be justified, even though the performance advantages ultimately expected to be achieved would be substantial.

Code translators are thus needed to ease the task of converting code written for one computer architecture to that executable on a more advanced architecture. The purpose of a code translator is to take in, as input, computer code written for execution on one type of architecture (e.g., VAX), and/or one operating system (e.g., VMS), and to produce as an output either executable code (object code) or assembly code for the advanced architecture. This is preferably to be done, of course, with a minimum of operator involvement. A particular task of a code translator is to detect latent error-producing features of the code, i.e., features that were acceptable in the prior use of the code as it executed on the previous operating system or architecture, but which may produce errors in the new environment.

SUMMARY OF THE INVENTION

In accordance with one embodiment of the invention, a code translator is constructed in a manner similar to a compiler, and may indeed be implemented as part of a compiler. The code translator accepts as an input the assembly code or source code which is to be translated, in a manner similar to the front end of any compiler. The input code is parsed to determine its content, with the basic building blocks of the code identified (separated) and converted into an intermediate language. The intermediate language version of the code is stored in a data structure referred to as a flow graph. The flow graph is referenced by flow analyzer techniques and optimization routines, before generating object code for the target machine. This translator is particularly adapted for translating VAX assembly language into an advanced RISC architecture.

In translating code of one of the CISC architectures into code for a RISC architecture, there appear certain architecture-specific and calling standard-specific coding practices that cannot be automatically converted. The compiler must detect these idioms and report them (via display or printer) to allow the user to make manual code changes. Among these practices, an important one is stack references which rely on the operation of VAX procedure call instructions. A VAX procedure call (e.g., a CALLS instruction) uses the stack to pass arguments, and it has been a coding practice to use the VAX procedure call in ways that result in errors if translated literally. By tracking stack usage within routines, the compiler can distinguish up-level stack and return address references from valid local references. In addition, it can inform the user of stack misalignment, which has a severe performance penalty. Finally, it can detect code segments where different flow paths may result in different stack depths at runtime, which may indicate a source code error.

For each routine being compiled, the compiler builds a flow graph and visits each basic block in flow order, beginning at the routine entry point. The compiler records the amount of which the stack pointer is changed in each block, and maintains the cumulative offset from the routine entry point. As it processes each instruction in the block, it can use this cumulative offset, along with any stack-based operand specifiers in the instruction (or stack reference implicit in the instruction), to distinguish whether the instruction:

reads the return address from the stack
modifies the return address on the stack
removes the return address from the stack
issues a JSB procedure call through the return address to implement a co-routine linkage
makes an up-level stack reference
makes an unaligned stack reference
modifies SP such that it is no longer longword aligned In each of these cases, the compiler/translator detects these occurrences so that user can be advised of the specific usage, and thus the user can make the appropriate changes to the source code. Multiple flow paths to the same basic block are also detected; these may result in different cumulative stack depths—the user can be advised of this occurrence, which is sometimes an indication of an error in the original source code, where a value was inadvertently left on the stack.

Another feature of interest in converting code from one architecture to another is that of register usage. Routines in VAX assembly language frequently preserve register values at routine entry points by pushing the values on the stack, and restore them before routine exit. In other instances, register values are pushed and popped around a small range of instructions which are known to destroy them. In code generated by the compiler for register saves for an advanced 64-bit RISC architecture, only the low 32-bits of the 64-bit register can be put on the stack, so that any references to higher stack addresses will continue to work. However, this compiled code will be executing in an environment where many routines use full 64-bit values, so that a 32-bit save/restore operation is not sufficient.

Accordingly, in one embodiment of the invention, the compiler tracks register usage to determine which registers are destroyed by a routine, and generate routine prologue and epilogue code which performs 64-bit register saves. As a result of this tracking, the compiler can also advise the user of registers which are input registers to the routine, or appear to be output registers. These register "hints" can aid the user in adding an entry point declaration or documentation for the routine. A declaration of routine output registers is required so that the compiler does not restore the original register value after it has been changed; the output register hints may also be useful in identifying these. The input register hints may also uncover bugs in which code incorrectly uses uninitialized register values.

For each basic block in the routine being compiled, the compiler tracks which registers are read and written by the instructions in the block. At the same time, it accumulates the set of registers written for the entire routine. During a forward flow-order walk through the basic blocks, the compiler computes which registers are written but not subsequently read, to be reported as possible output registers of the routine. During backward flow-order walks from all exit points of the routine, the compiler computes which registers are read before being written, to be reported as possible input registers.

When generating code for the routine, the compiler uses the list of registers written to determine which should be saved by routine prologue code. Registers which have been explicitly declared as routine output or scratch registers are removed from the set. Routine epilogue code is generated to perform the register restores.

According to another feature of one embodiment of the invention, the usage of condition codes are tracked. Many computer architectures such as VAX make use of condition codes (overflow, equal to zero, not equal to zero, etc.) generated by the ALU and internally stored for later reference in a conditional branch, for example. Nearly all VAX instructions modify these condition code bits which are part of the machine architecture. Other instructions test these bits to detect conditions such as overflow or perform conditional branches. In addition, because these bits survive jump-subroutine (JSB) routine invocations, they are sometimes used in assembly language as implicit routine parameters or return status codes (though this is not a recommended coding practice). An advanced RISC architecture has no condition code bits; instead, when a condition is to be needed, an explicit test is made and the result stored in a register for later use. As a result, when VAX code is translated for this RISC architecture, the compiler must track condition code usage in source programs so that the code to fabricate their values is only generated when the values are actually used. In the vase majority of instances, the condition codes automatically generated in the VAX architecture are not actually used, so it would be an unnecessary burden to generate all the condition codes. The translator must also detect the case where condition codes are used as implicit parameters or status return values and report it to the user, since that behavior cannot be emulated, but instead must be recorded. It is also possible that a routine which uses a condition code value set by its caller may actually contain a coding error.

To accomplish this condition code tracking, according to one embodiment, the compiler builds a flow graph of each routine being compiled. It subsequently walks this graph in reverse flow order from all exit points, through all basic blocks, up through the routine entry point, maintaining a map of which condition codes are "required" for instructions it has processed. At entry to a basic block, the compiler records which condition codes its successor requires. It then examines the instructions in the block in reverse order. If the instruction sets any condition codes, it will remove them from the "required" set, and set corresponding bits in the instruction data structure, which direct the code generator to fabricate those condition codes. If the instruction reads any condition codes, it will add them to the "required" set. When all instructions in the block have been read, the compiler will record the set of condition codes still "required as "input" to this block. This will continue through all predecessors of the current block.

If a JSB instruction is encountered during this reverse-flow walk through the flow graph, and the "required" set is non-empty, the user is informed that condition codes appear to be used as implicit JSB routine outputs.

It is possible and likely that a node will be visited more than once during these backward walks. When a node is revisited, the compiler will compare the current "required" set against the initial set stored by the previous 7alk, and terminate the traversal if the required codes were previously searched for.

After all backward paths have been examined, the compiler checks the basic block corresponding to the routine entry node. If the "input" set is not empty for this node, the user is informed that the routine expects condition codes as input and that a source code change is required.

Another issue encountered in translating code to a different machine architecture is the way argument list references are handled. VAX assembly language routines rely on the argument list pointer (AP) established by the VAX CALLS/CALLG instructions to refer to routine parameters. On an advanced 64-bit RISC machine, there is no architected argument list pointer, and the calling standard dictates that parameters are passed in registers, and, if necessary, on top of the stack. The code translator, according to another feature of one embodiment of the invention, resolves this difference without requiring all argument list references to be modified in the source code. The argument list references are mapped across the architectures in making the code translation.

The compiler examines all AP-based memory references in the input code to determine how the same argument reference may be made in the target environment. Element 0 of the argument list vector represents the argument count on VAX; in the target RISC architecture, the argument count appears in a defined register, e.g., the Argument Information Register (R25). Hence, in this instance, a memory reference of the form 0(AP) will be compiled to an R25 reference. The first six arguments are received in registers R16–R21 on in the target RISC architecture, so that 4(AP) will be compiled to use R16, 8(AP) to use R17, etc.

In some cases, the compiler mimics VAX argument lists by packing the quadword register and stack arguments into a longword argument list on the stack. This argument list "homing" occurs if the compiler detects any AP uses which may result in aliased references to the argument list, any AP references with variable indices, or any non-longword aligned AP offsets. In this case, argument list references are compiled into FP (frame pointer) based references to the homed list, which is built by code generated for the routine entry point.

When a CALLS (call subroutine) instruction is encountered in the input VAX code, the compiler generates code to copy arguments from the stack, where they have been placed by the original source code, into the RISC argument registers. If there are more than six arguments (requiring more than R16-R21), the seventh and beyond must be copied to consecutive aligned 64-bit slots on top of the stack. The argument information register R25 receives the argument count, which, on VAX, would have been at 0(FP). Corresponding code to clean the stack after the called routine returns is also generated.

BRIEF DESCRIPTION OF THE DRAWINGS

The novel features believed characteristic of the invention are set forth in the appended claims. The invention itself, however, as well as other features and advantages thereof, will be best understood by reference to the detailed description of specific embodiments which follows, when read in conjunction with the accompanying drawings, wherein:

FIG. 3 is a diagram of an example of a line of code translated by the mechanism of FIGS. 1 and 2;

FIG. 5 is a more detailed diagram of the compiler front end in the translator of FIG. 1;

FIG. 6 is a listing of a small example of code illustrating the basic blocks or nodes of the code;

FIG. 7 is a flow graph of the program expressed in the code of FIG. 6;

DETAILED DESCRIPTION OF SPECIFIC EMBODIMENT

Figure 1:
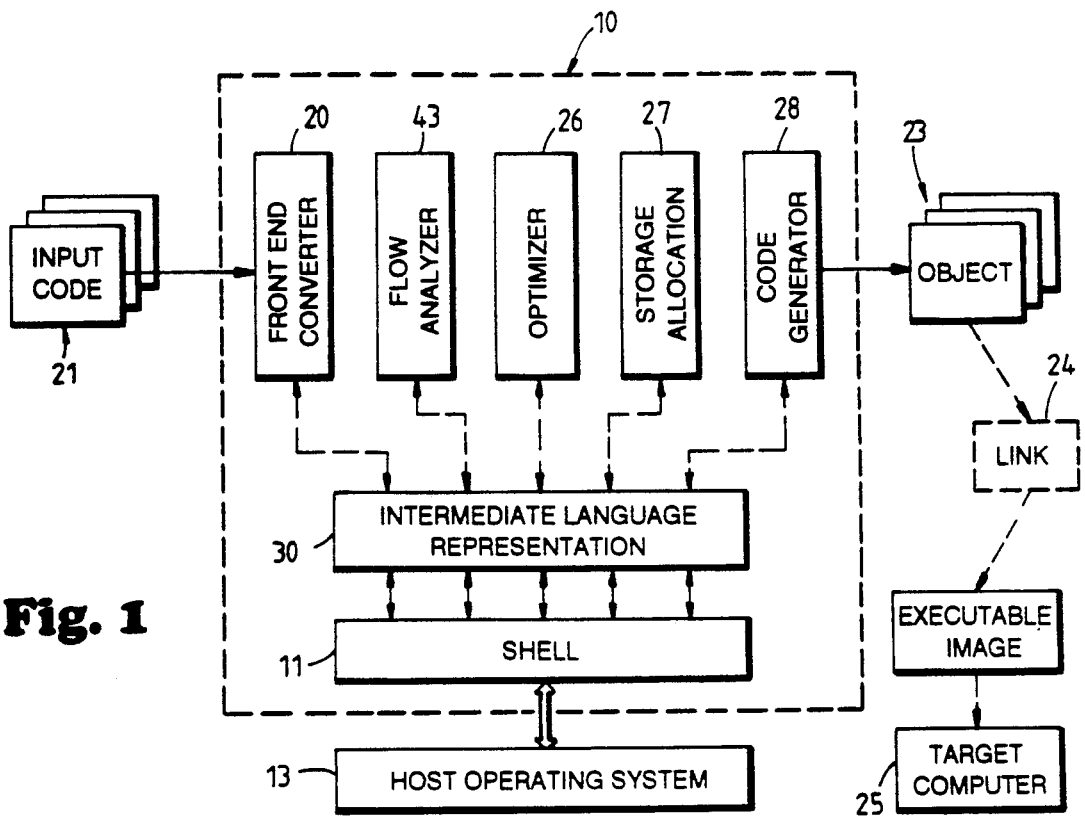
FIG. 1 is a diagram of the compiler or code translator functions, according to one embodiment of the invention.
Figure 2:
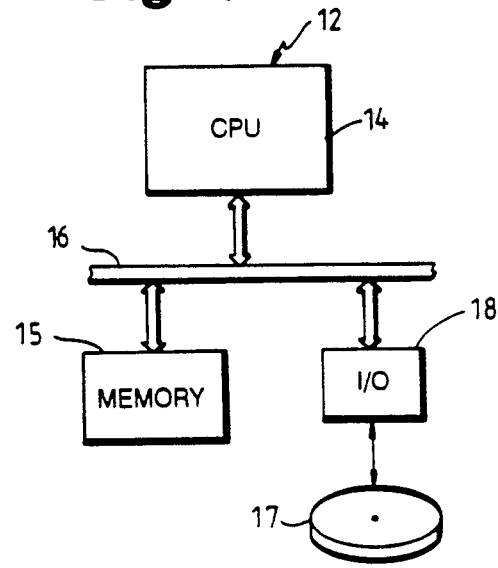
FIG. 2 is an electrical diagram of a host computer for executing the code translator program of FIG. 1.

Referring to FIG. 1, the code translator or interpreter 10 according to one embodiment of the invention resembles a compiler, and includes a portable operating system interface referred to as the shell 11, as well as a front end for converting the code and a back end, with optimizer and code generator, as is the usual practice. The shell 11 may be portable in that can be adapted to function with any of several operating systems such as VAX/VMS, Unix, etx., executing on the host computer 12. The shell 11 operates under this hose operating system 13 executing on a host computing system 12 of various architectures, as seen in FIG. 2, typically including a CPU 14 coupled to a main memory 15 by a system bus 16, and coupled to disk storage 17 by an I/O controller 18. The shell 11 and other elements are combined with a front end converter 20 to create a translator or "compiler" for converting code in a first language, e.g., VAX/VMS assembly language, into object code for a different target architecture, e.g., and advanced 64-bit RISC architecture.

The front end converter 20 is the only component of the translator 10 which understands the input language being translated (compiled). This input language is that used in the file or files (module or modules) 21 which define the input of the translator. The front end converter 20 performs a number of functions. First, it calls the shell 11 to obtain command line information entered by the user (person operating the host computer 12 of FIG. 2). Second, the front end 20 calls the shell 11 to control the listing file, write diagnostic messages, and the like, as is usual for compilers. Third, the front end 20 does lexical, syntactic, and semantic analysis to translate the code of the input file 21 to a language-independent internal representation used for the interface between the front end and the back end. Fourth, the front end converter 20 invokes the back end (remaining parts of the translator) to generate object code modules 23 from the information in the internal representation. Not included in the translator 10 of FIG. 1 is a linker 24 which links the object code modules or images 23 (with run-time library, etc.) to form an executable image to run on the target machine 25.

The target machine 25 for which the back end 12 of the compiler creates code is a computer (generally of the form of FIG. 2) of some specific architecture, i.e., it has a register set of some specific number and data width, the logic executes a specific instruction set, specific addressing modes are available, etc. Examples are (1) a RISC type of architecture based upon the 32-bit RISC chip available from MIPS, Inc., as part number R2000 or R3000 and described by Lane in "MIPS R2000 RISC Architecture", Printice-Hall, 1987, and (2) an advanced RISC architecture with 64-bit registers as described in copending application Ser. No. 547,589, filed Jun. 29, 1990. Various other architectures could be likewise accommodated, employing features of the invention.

In general, the front end converter 20 need not consider the architecture of the target machine 25 upon which the object code 23 will be executed, when the front end 20 is translating from source code 15 to the internal representation, since the internal representation is independent of the target machine 25 architecture.

The back end of the translator 10 functions like a compiler to translate the internal representation constructed by the front end 20 into target system object code 23. To this end, the back end performs the basic functions of optimization 26, storage and register allocation 27, and code generation and object file emission 28. The optimization function is performed on the code when it is in its internal representation.

When the user (that is, a user of the computer system of FIG. 2, where the computer system is executing the operating system 13) invokes the translator of FIG. 1, the shell 11 receives control. The shell 11 invokes the front end converter 20 to compile an input stream from input module 21 into an object file 23; the front end 20 invokes the back end to produce each object module within the object file 23.

The front end 20 parses the input code 21 and generates an intermediate language version of the program expressed in the input code. This intermediate language version is stored in intermediate language tables 30 (including a symbol table), which are updated and rearranged by the stages of the compile functions as will be described. The elemental structure of the intermediate language is a tuple. A tuple is an expression which computer programming language performs one operation. For example, referring to FIG. 3, an expression which might be written in a high level computer language as $I = J + 1$ would appear in the assembly-language input file as

ADDL3 #1,J,I that is, add "1" to the contents of memory location J and place the result in memory location I. This code will be eventually translated into object code for a RISC machine which does only register-to-register arithmetic, and only register-to-memory or memory-to-register stores and loads, so it will appear as

| LOAD Rn,J | ; Load memory location J to Register N |
| ADD Rn,#1 | ; Add constant 1 to Register N |
| STORE Rn,I | ; Store Register N to memory location I |

In intermediate language, however, the code is in a more elemental (and generic) form than even RISC assembly, and would include five tuples, these being number $1, $2, $3, $4 and $5 in FIG. 3. This way of expressing the code in IL includes a tuple $2 which is a fetch represented by an item 31, with the object of the fetch being a reference to symbol J, shown in tuple #1. The next tuple is a literal, item 32, making reference to the constant "1." The next tuple, item 33, is symbol reference to "I", which will be the target of the addition operator. The last tuple is an Add, item 34, which makes reference to the source tuples $2 and $3, and to the destination tuple $4. The expression may also be expressed as a logic tree as seen in FIG. 3, where the tuples are identified by the same reference numerals.

Figure 4:
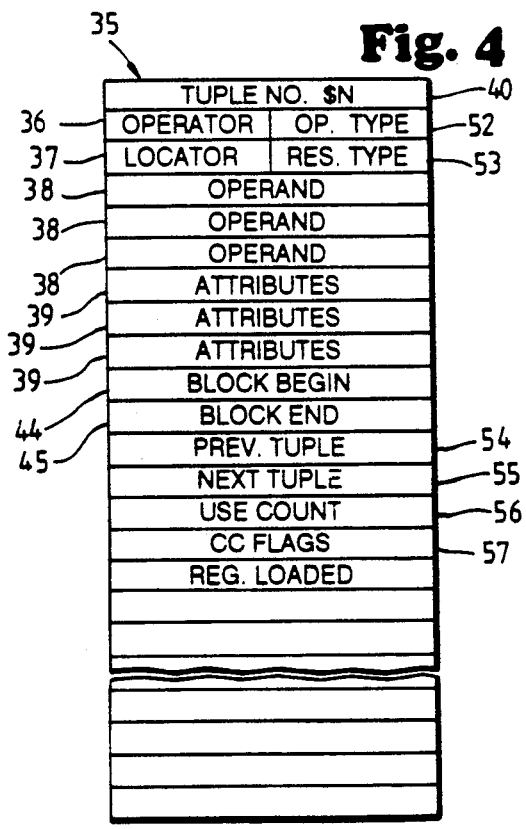
FIG. 4 is a diagram of the data structure of a tuple created in the code translator of FIG. 1.

A tuple (also referred to as an n-tuple), then, is the elemental expression of a computer program, and in the form used in this invention is a data structure 35 which contains at least the elements set forth in FIG. 4, including (1) an operator field 36, e.g., Fetch, Store, Add, etc., (2) a locator 37 for defining where in the input module 21 the input-code equivalent to the tuple is located, (3) operand pointers 38 to other tuples, to literal nodes or symbol nodes, such as the pointers to I and #1 tuples $1 and $2 in FIG. 3. A tuple also has attribute fields 39, which may include, for example, Label, Conditional Branch, Argument (for Calls), or SymRef (a symbol in the symbol table). The tuple has a number field 40, representing the order of this tuple in the block.

Referring to FIG. 4, the front end converter 20 parses the input code 21 to identify tuples and to build an intermediate language tuple stream 41 and associated symbol table 42. The next step is performed by a flow analyzer 43 is to scan the tuple stream and identify basic blocks of code, called nodes. A block of code is defined to be a sequence of tuples with no entry or exit between the first and last tuple. Usually a block starts with a label or routine entry and ends with a branch to another label. A task of the converter 20 and flow analyzer 43 in the front end is to parse the input code 21 and identify the tuples and blocks (nodes), which of course requires the front end to be language specific. The tuple data structure 35 contains fields 44 and 45 that say whether or not this tuple is the beginning of a block, or the end of a block.

A flow graph 46 is generated by the flow analyzer 43 in the front end. The flow graph 46 consists of nodes, which are the basic blocks of the program, and edges, which represent the flow between nodes. The flow graph is built by processing the tuples 35 (intermediate language) created by the front end converter 20 of the compiler.

The process of building the flow graph 46 by the flow analyzer 43 includes walking the tuples sequentially for each program section. Referring to an example of code as seen in FIG. 6, the flow analyzer 43 adds tuples to the current flow node until one of the following is encountered, thus defining when the previous node ends and a new node begins:

(a) a label—branches to the label LAB1 will result in an edge being created to this node; hence, the label LAB1 is the first tuple in the new node Node−3, and it creates the edge ending Node−2;

(b) a routine entry point, in this case JSB_entry (the first tuple in Node−1, which is treated like a label for purposes of flow—however, the routine entry has an additional symbol table entry Rout1 identifying it as a routine;

(c) a branch instruction—the branch BEQL ends the preceding block, Node−1, and the next instruction CLRL begins a new block, Node−2;

(d) a return instruction, RSB, which is treated like a branch instruction which branches to a special routine exit node; thus RSB ends Node−3, which is only one tuple in length.

A branch instruction such as the BEQL of FIG. 6 also results in an edge being created, linking the node (Node−1) containing the branch to the node (Node−3) containing the label which is the branch destination (LAB1). If the branch is conditional, as here, an edge to the immediately following node (Node−2) will also be created, since flow may "fall through" to it. Indeed, an edge is a bidirectional link; the flow needs to be traceable in both forward and backward directions.

Accordingly, the intermediate language used in the code translator of FIG. 1 is expressed in the tuple stream 41 and a symbol table 42, along with the flow graph 46. The primitive concept is the tuple, and the intermediate language flow graph 46 is made up to link the tuples into node or blocks representing the operations to be executed, each tuple 35 having a data structure as in FIG. 4. These tuples 35 within nodes are tied together by pointers which represent various relations. The most important relations are the operator-operand relation (a pointer 38 from an operator to each of its operands) and the linear ordering represented as a tuple number field 51 on all the tuples in each basic block of the intermediate language flow graph 46; the order of the tuples within a node provides the execution order.

As mentioned in reference to FIG. 4, each tuple 35 has various fields, including the following:

(a) Generic operator 36—identifying the general operation performed by the tuple, e.g., ADD, FETCH, etc.

(b) Operator type 52—a data type which, normally, determines the specific operation performed by the tuple. The operator data type is primarily of interest only on data storage tuples. Instruction tuples are by definition self-contained, and will not be referenced in later instructions; hence, their data type is null.

(c) Result type 53—the data type of the value computed by this tuple. This is set only on data reference tuples, e.g., those that can be used as /perands of other tuples.

(d) Operands 38—an array of pointers to the operands of this tuple. The number of operands is determined by the generic operator. Each operand pointer 38 points to another intermediate language tuple node, or, in some cases, to a symbol or literal node in the symbol table as in tuples $1 and $2 of FIG. 3.

(e) Next/Prev tuple 54 and 55—pointers to the next and previous tuples in a doubly-linked list of tuples. The next tuple order is the implicit order of evaluation.

(f) Locator 37—the textual location in the input module 21, i.e., in the program source of the token or tokens which are compiled in this tuple. The locator is used in constructing error messages, source correlation tables, etc.

(g) Use count 56—this field is set by the analyzer to the number of references made in data reference tuples.

Some types of tuples have additional fields, known as attributes 39. Instances of attributes in the code translator in an embodiment of FIG. 1 include:

(a) Reference attributes, which point to nodes in the symbol table 42

These are always present in LITREF, SYMREF, LABEL and entry point tuples, pointing to literal nodes, symbol nodes, label nodes, and entry nodes, respectively. A pointer to a literal node may also be present in a COMP_OP tuple. These symbol table entry types are discussed in additional detail below.

(b) Instruction attributes, which are VAX instruction type constants. These are present in INSTR (instruction) and CONDBR (conditional branch) tuples, and further specify the instruction or branch operation.

(c) Register attributes, which are simply register numbers specified in REGREF (register reference) tuples.

Other additional private fields may be introduced into the tuple structures by the analyzer or code generator; these include:

(a) Condition code flags in field 57 on INSTR and CONDBR tuples. These are used by the flow analyzer 43 to indicate that the code generator 28 must instantiate one or more of the VAX condition code values for an instruction.

(b) A register-loaded field 58 for SYMREF, MEMREF, IDXREF and FETCH tuples, used within the code generator 28 to allow re-use of addresses or values already loaded to registers.

The flow graph 46 is a major component of the intermediate representation, and is constructed and used by the flow analyzer 43, then later traversed by the optimizer 26, the storage allocator 27 and code generator 28. The tuples 35 for a particular routine or program (or input module 21) are in the tuple stream 41, linked by pointers 38, 54, 55, and having blocks or nodes defined by fields 48, 49. The flow graph 46 identifies the nodes or blocks by pointers to the beginning and ending tuples of the tuple stream. Since routines, labels, etc., will have entries in the symbol table 42, the symbol table is the reference point for tracing the program, i.e., finding the blocks and their ordering. The flow graph of the code of FIG. 6 may be illustrated as in FIG. 7, where it is seen that there are two paths from Node−1, that is, to Node−3 via Node−2 if the conditional branch fails, or directly to Node−3 if the branch is taken.

A routine such as that of FIG. 7 has an entry or node 59 in the symbol table 42 as seen in FIG. 5 which includes a pointer 60 to the flow node 61 in the flow graph 46, and this node 61 includes pointers 62 and 63 to the beginning and ending tuples 35 of the tuples stream 41. Each flow node 61 also has a number of other fields, e.g., for stack usage, register usage and condition code usage, as will be described.

Once a pass over the tuples by the flow analyzer 43 has created the flow graph 46, the flow for each routine can be walked by the flow analyzer 43 for computing the stack, register, and condition code information of interest for certain features of the invention.

A pass is made by the flow analyzer 43 through each routine in the module 21 as represented in intermediate language as illustrated in FIG. 5. The routine node 59 in the symbol table 42 points to the flow node 61 for the entry point of the routine. The flow graph 46 is recursively traversed starting at this node; first, the tuples 35 of a node as referenced in the tuple stream 41 will be walked looking for constructs described below. Then, the graph traversal routine is called for each of its successors (nodes 61 linked by a forward edge) which has not already been visited. The recursive walk ends at nodes which have only routine exit nodes as successors.

The tuples 35 of each node 61 are scanned looking for the following:

(a) Register reference—if the reference is a "read" reference, and the register has not yet been written in the current node, it is recorded as part of the node 61 as an "input register" to the current node, in a field 64 for input registers. If it has been written, it is removed from the "output register" set, i.e., from a field 65 for output registers.

If it is a "write" reference, it is added to the "output register" set of field 65, and the "written register" set of field 66 for the current node 61.

The "output register" set of field 65 is passed on to each of the successor nodes 61 visited. Then, when the flow graph 46 walk completes, this set of field 65 represents the registers which are written but not subsequently read in the routine. This set is reported to the user in a "hint" message, as possible output registers of the routine. The user may use this information to add the correct OUTPUT register clause to the routine entry point declaration.

(b) Stack references and modifications—modifications to the stack may be the result of explicit instructions, such as PUSH/POP, ADD, etc., or due to the VAX addressing mode used, such as (SP)+, which implicitly pops the stack pointer.

At the end of the tuples 35 for the current node 61, the net change to SP due to the tuples in this node is stored in a field 67 in the flow node. The total depth thus far in the routine flow is also computed. This is passed to the node processing routine with each recursive call, and stored in the node in a field 68.

Thus, at every point during this walk, the compiler has available the total stack change since routine entry. This allows it to detect code which:
(i) reads the return address from the stack
(ii) modifies the return address on the stack
(iii) removes the return address from the stack
(iv) issues a jump-subroutine JSB procedure call through the return address to implement a coroutine linkage
(v) makes an up-level stack reference
(vi) makes an unaligned stack reference
(vii) modifies SP such that it is no longer longword aligned These are all flagged with specific errors. The first five are machine architecture and calling standard-specific coding practices which must be changed manually in the source code. The latter two are flagged due to the performance penalties of unaligned stack references.

As mentioned above, successor nodes 61 in the flow graph 46 which are already marked "visited" in a field 69 are not re-visited; however, the flow analyzer 43 checks the initial stack depth stored with the node in field 68. If that depth is different than the total depth at the end of the current node 61, the compiler reports a message indicating that this point in the code can be reached with different stack depths. This may indicate a source code error, where the stack was not correctly adjusted by the user on some code path. A simplified example of this might be:

```
        pushl   r1
        beql    lab1
        .
        .                ; instructions which do not modify SP
        .
        pushl   r2
        .
        .                ; instructions which do not modify SP
        .
lab1:   popl    r2       ; This point may be reached with 1
                         ; or 2 new longwords on the stack.
        rsb              ; In this case. it is probably an
                         ; error, because the RSB instruction
                         ; expects the return address
                         ; to be on top of the stack.
```

The flow analyzer 43 the makes a second pass through each routine in the module. This time, the walk is in reverse flow order, starting at the routine exit node, and walking backward through all paths back to the routine entry point. This is also a recursive graph walk, using the edges which link each node 61 to its predecessors. This time, nodes 61 may be revisited multiple times.

The tuples 35 of each node 61 are scanned in reverse order, looking for the following:

(a) instructions which read the VAX condition codes. For example, conditional branch instructions. A set of which condition codes (CCs) are currently "required" as recorded in a field 70 is updated. For example, when a BEQL is seen, the Z bit will be added to this set.

(b) instructions which set the VAX CCs which are currently in the "required" set of field 70. When found, a flag 57 corresponding to the particular CC is set in the instruction tuple 35, and it is removed from the "required" set of field 70. This flag 57 in the tuple tells the code generator phase 28 that it must realize the value of that condition code for this instruction. This allows the compiler to calculate CC information only when it is absolutely required.

(c) JSB instructions. If the "required" set of field 70 is not empty when a JSB instruction is encountered, the source code as written relies on a CC being set by the JSB target routine, and still intact upon return. Since the CCs are not hardware bits on some advanced RISC architectures, for example, as they are on VAX, this architecture specific coding practice must be changed—so an error message is generated.

At each call to process a node's predecessor, the current "required" set of field 70 is passed, and stored in field 70 of the predecessor node. The node is then processed as above. If the node is encountered later in another backward flow path, but the "required" set is a subset of the set previously stored, the node (and its predecessors) does not need to be revisited. However, if the new "required" set contains CCs not previously searched for, the node must be re-processed to insure the CC flag is set on the correct instruction.

Also at each call to process a node's predecessor, the current node's "input register" set of field 64 (computed in the forward walk) is passed. The "input register" set of field 64 for the predecessor is then updated to include those registers in the passed set which are not in its own "written registers" set of field 66. As a result, the "input register" set for a node will eventually reflect all registers read by this node or any of its successors which are "input" to this point in the flow. Also for each node, the node's "written registers" set of field 66 is added to the "written" set for the current routine.

After all reverse paths through a routine have been processed thusly, the information stored in the flow node 61 for the routine entry point is examined. If the "required" CC set of field 70 is not empty, it implies that the corresponding condition codes are expected as input to this routine. This is a VAX architecture specific coding practice, and it therefore flagged as an error; it is undesirable on some architectures and impossible on others. (This may also be indicative of a coding error, rather than an intentional interface.) The particular CCs required as inputs are reported to the user is the printout. If the "input register" set stored in this node at field 64 is not empty, those registers are reported in a compiler "hint" message as possible input registers to the routine. These registers can then be added to the entry point declaration as input registers. (Again, this may also detect a coding error, where an uninitialized register is inadvertently used.)

The "written" set of field 66 for the routine is used in conjunction with the OUTPUT register declarations for the routine, to determine which registers the compiler must generate code to save. The original values of these modified registers may be saved in the source code, using, for example, PUSHL and POPL instructions. However, these instructions will only save the low 32-bits of the register value. Since the code will be executing in a 64-bit environment if code is being generated for the advanced 64-bit RISC architecture, the compiler must generate 64-bit register saves in routine prologue code, and restore them in routine epilogue code. The compiler saves those in the "written set" which are not declared to be OUTPUT (or SCRATCH) registers. (ROA 2)

The following program is used to illustrate these concepts:

```
Test:       .jsb_entry
            pushl       r0
            beql        lab2
            addl3       r1,r2, -(sp)
            blss        lab1
            movl        (sp)+, r3
            brb         lab2
lab1:       addl2       #4, sp
lab2:       popl        r5
            rsb
```

Figures 8, 9:
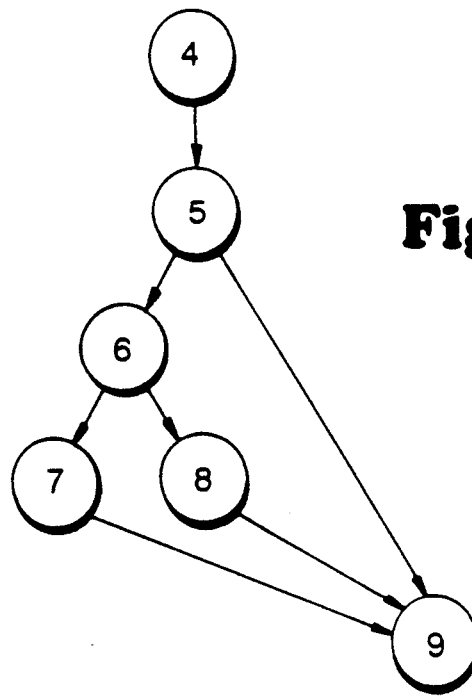
FIG. 8 is a listing of another example of code used as the basis for the example of Appendix A.
FIG. 9 is a flow graph of the program expressed in the code of FIG. 8.

This same program is also shown in FIG. 8, where it is seen that the tuples are numbered $22 to $31, and the nodes are numbered Node−4 to Node−9. The flow of the nodes for this program is seen in FIG. 9. For this program, the output of the front end converter 20 is shown in Appendix A, showing how the program is represented as the tuples $22-$31 in the intermediate language. The numbers such as 1725024 are the byte addresses of the data location for the present part of a tuple, the previous part and the next part, so the data structure of FIG. 4 for a tuple 35 may be found in memory, and the ordered sequence of tuples is traceable. Also, it is seen that the operands (fields 38 of FIG. 4) are identified by pointers to the actual memory location of the specification of these elements. Next, the flow analyzer 43 output is given in Appendix B, showing the flow nodes and their linkages. Note that the tuples are re-ordered somewhat. The output code generated for this program as a result is given in Appendix C.

In Appendix D, a listing is given for a different program (not that of FIG. 6) showing some of the compiler messages mentioned above. This listing is printed out by the facility ordinarily included in a compiler for producing a source code listing for use in error checking and correction.

Referring to FIGS. 10-15, logic flow charts are illustrated which represent a view of the flow analysis involved in methods having features of the invention. The calling structure is summarized in the following paragraphs.

Figure 10:
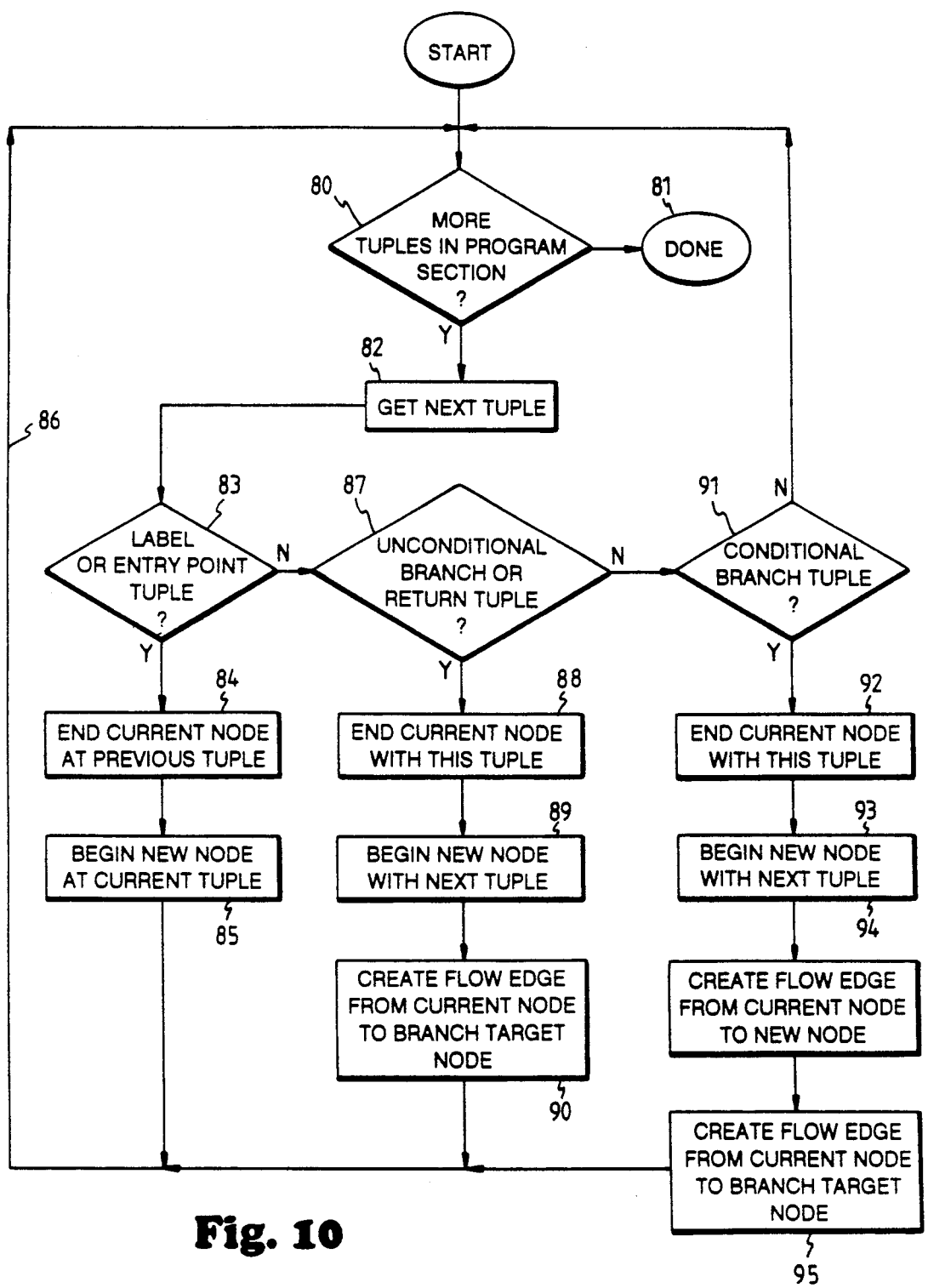
FIG. 10 is a logic flow chart of a procedure referred to as Build_Flow_Graph, used in the method of the invention, according to one embodiment.

The procedure referred to as Build_Flow_Graph, illustrated in FIG. 10, is called once per compilation, and functions to build all of the routine flow graphs for the entire module being compiled.

Figure 11:
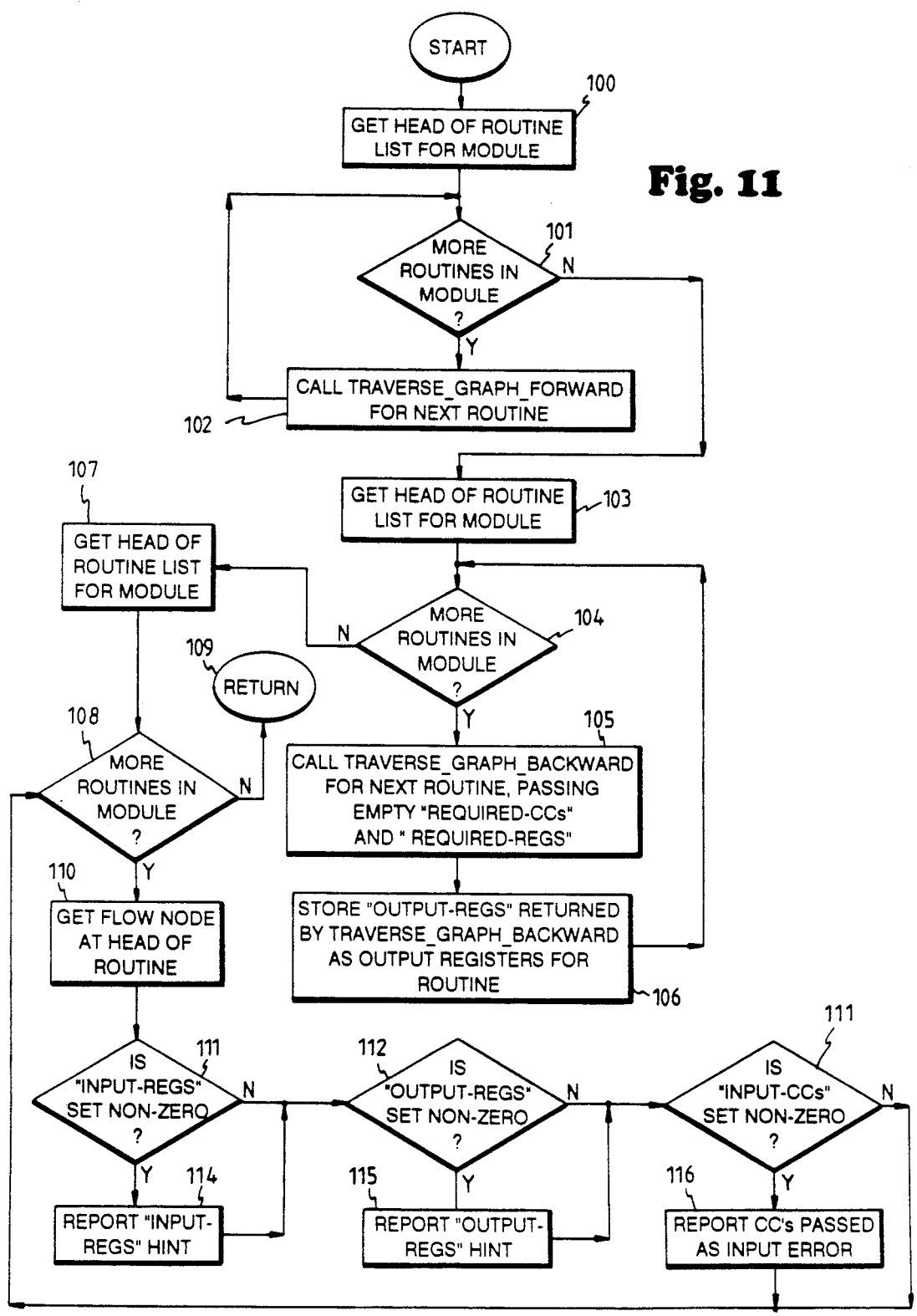
FIG. 11 is a logic flow chart of a procedure referred to as Analyze_Flow_Graph, used in the method of the invention, according to one embodiment.

The procedure referred to as Analyze_Flow_Graph, illustrated in FIG. 11, is called after Build_Flow_Graph, also once per compilation, and functions to perform the analysis on all the routines in the module.

Figure 12:
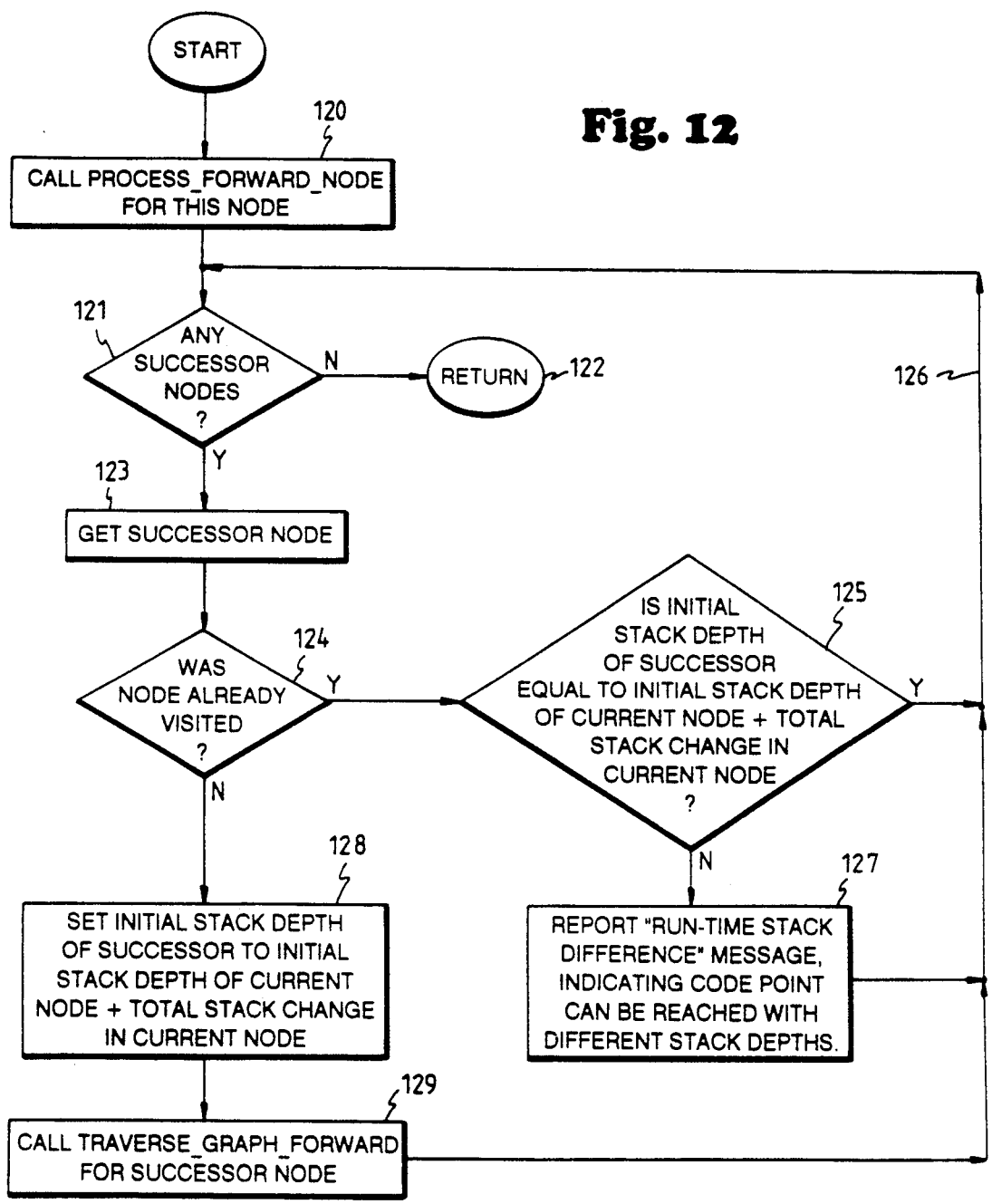
FIG. 12 is a logic flow chart of a procedure referred to as Traverse_Graph_Forward, used in the method of the invention, according to one embodiment.
Figure 14A:
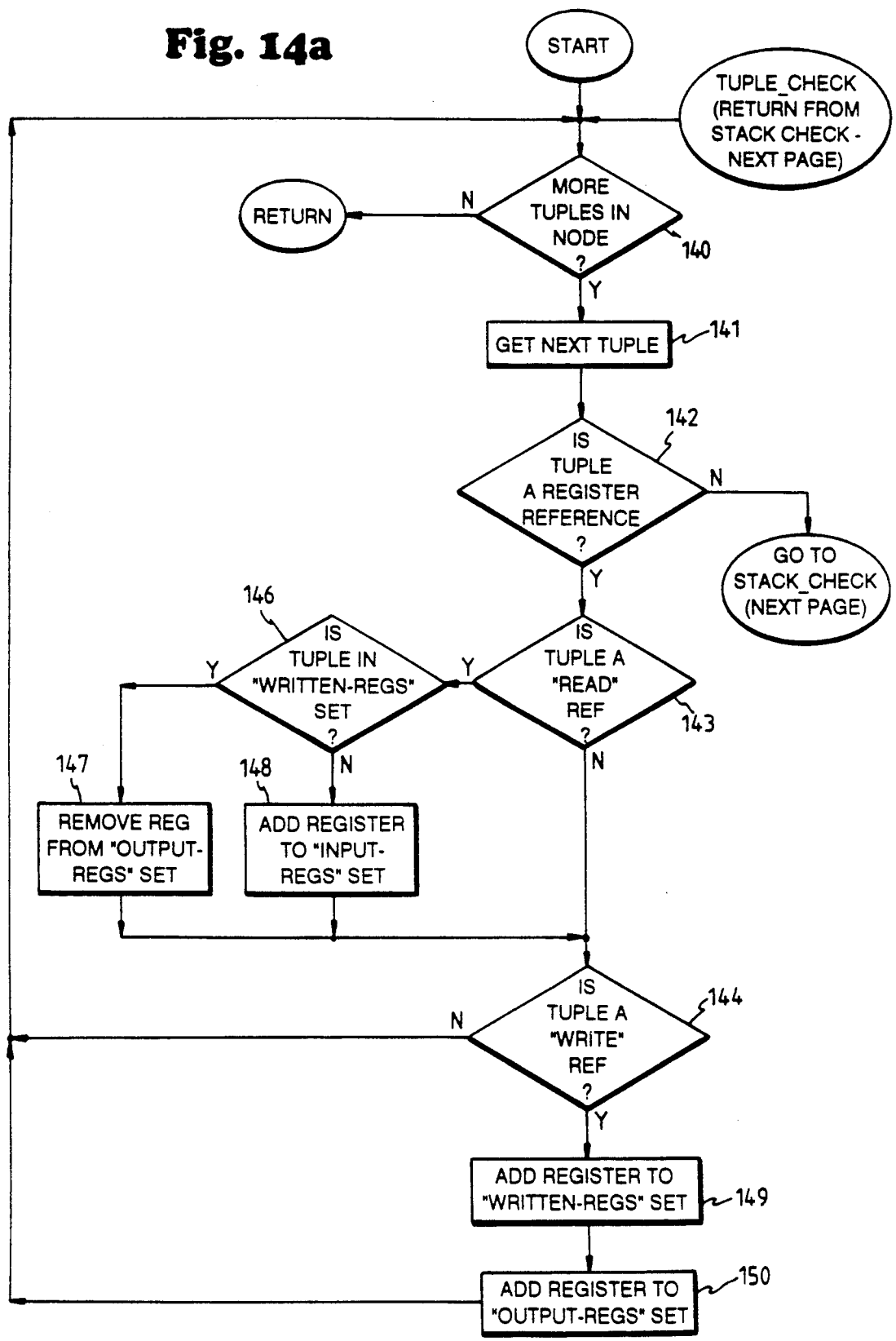
FIGS. 14a and 14b are a logic flow chart of a procedure referred to as Process_Forward_Node, used in the method of the invention, according to one embodiment.

The procedure referred to as Traverse_Graph_Forward, illustrated in FIG. 12, is called by Analyze_Flow_Graph, and itself calls Process_Forward_Node of FIG. 14a, to process the tuples of the current node in forward order, and then calls itself recursively for each successor of the current node which has not already been visited.

Figure 13:
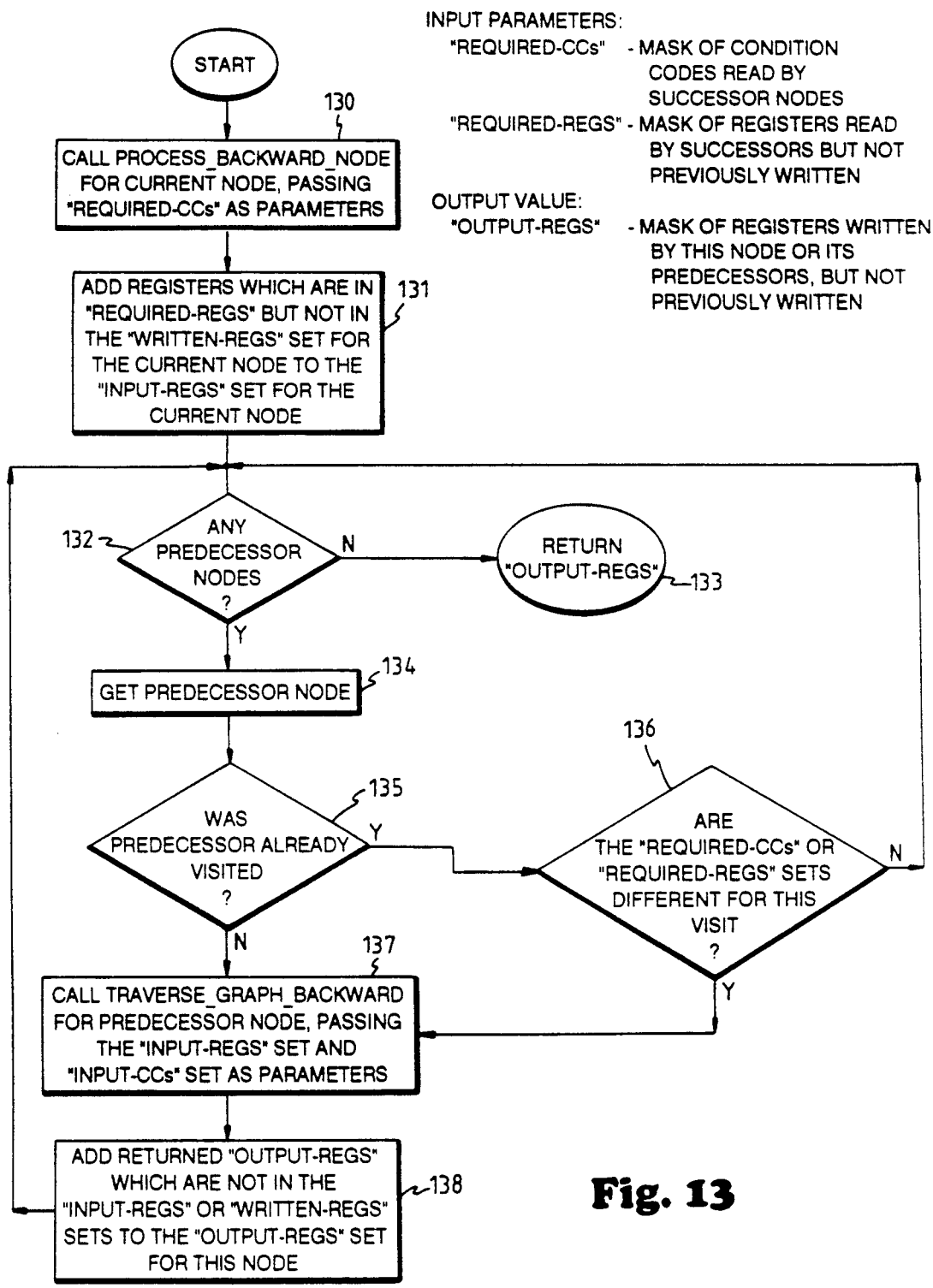
FIG. 13 is a logic flow chart of a procedure referred to as Traverse_Graph_Backward, used in the method of the invention, according to one embodiment.
Figure 15:
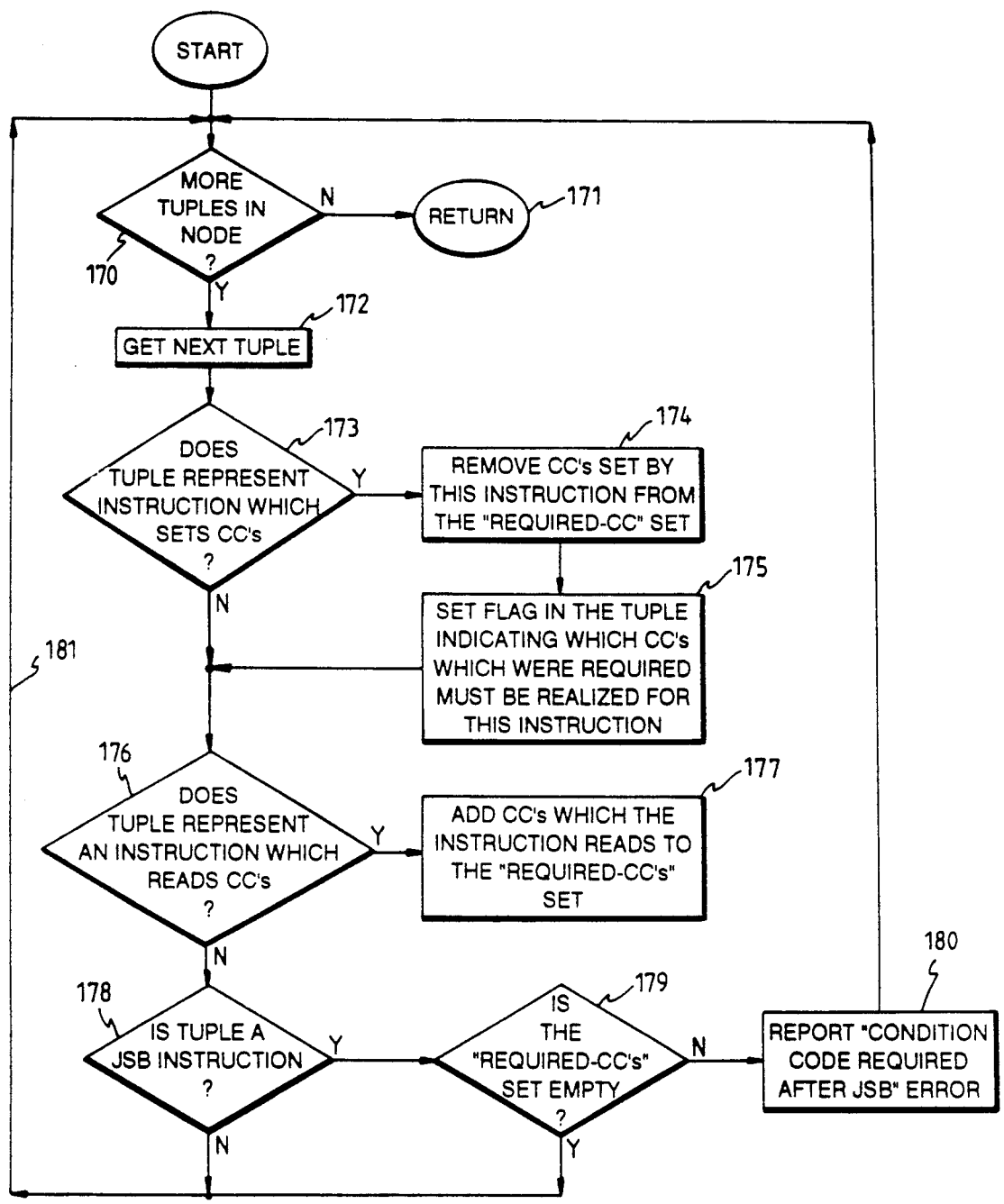
FIG. 15 is a logic flow chart of a procedure referred to as Process_Backward_Node, used in the method of the invention, according to one embodiment.

The procedure referred to as Traverse_Graph_Backward, illustrated in FIG. 13, is called by Analyze_Flow_Graph, and itself calls Process_Backward_Node of FIG. 15, to process the tuples of the current node in reverse order, and then calls itself recursively for each predecessor of the current node, unless it has been visted and the register and condition code information stored in it indicate that a re-vist is not necessary.

Figure 14B:
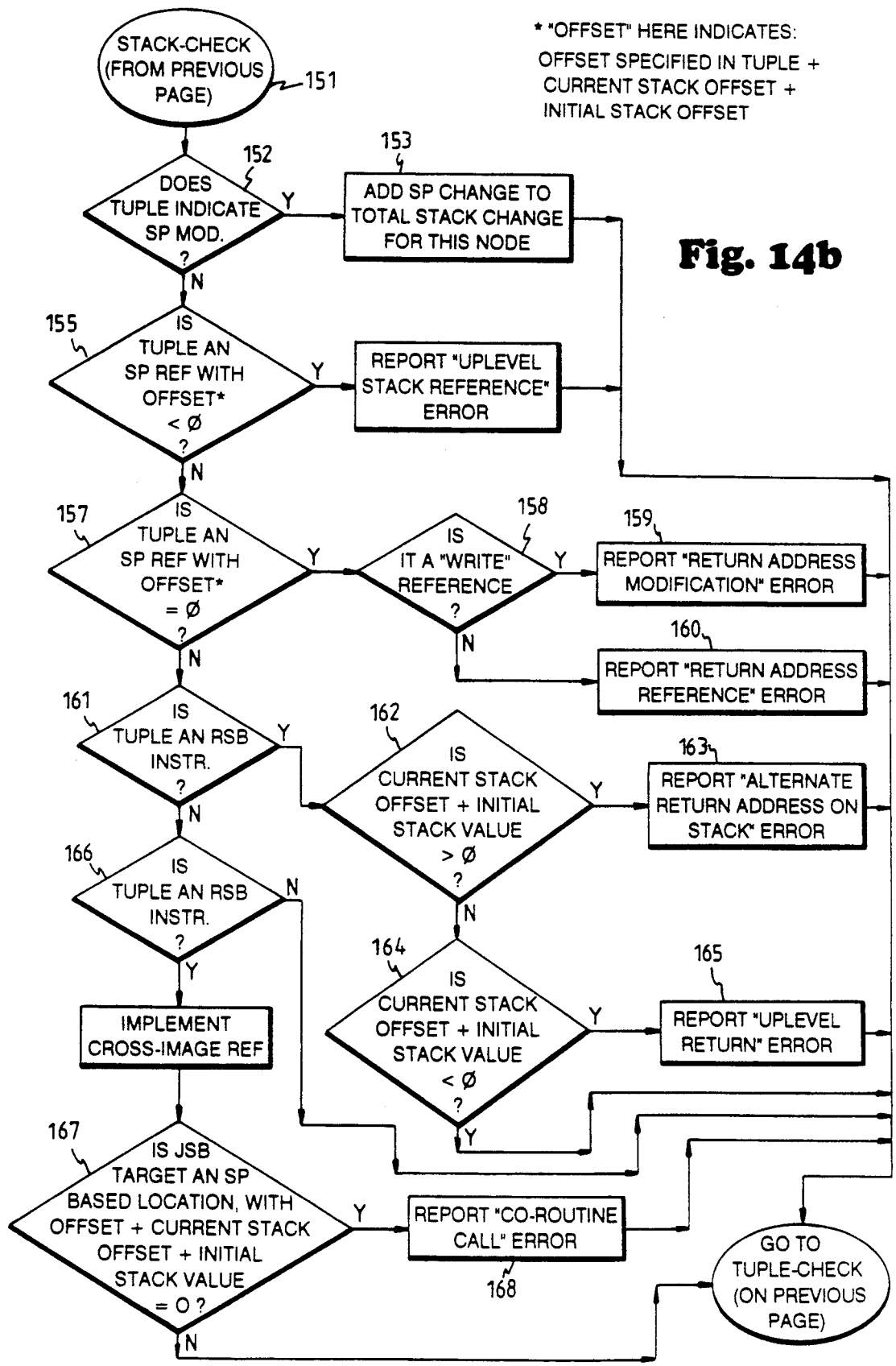

The procedure referred to as Process_Forward_Node, illustrated in FIG. 14a-14b, is self-contained, and functions to simply walk the tuples in forward order.

The procedure referred to as Process_Backward_Node, illustrated in FIG. 15, is self-contained, and functions to simply walk the tuples in reverse order.

The "pseudo-variables" used in the flow charts of FIGS. 10-15 will be described, before describing the flow charts in detail. The pseudo-variables are represented in the flow charts as names in quotes, and reference to the fields of FIGS. 4 or 5 is also given:

"Input_CCs" or input condition codes (field 71)—for a flow node, "Input_CCs" are the set of condition codes which are "required" at entry to the flow node. That is, some instructions either in this node or one of its successors read these condition codes, and the instructions which set them precede this node.

"Input_regs" or input registers (field 64)—for a flow node, "Input_regs" are the set of registers which are read in this node or one of its successors, and the instructions which write into these registers proceed this node.

"Output_regs" or output registers (field 65)—for a flow node, "Output_regs" are the set of registers which are written in this node or one of its predecessors, but not subsequently read by this point in the flow graph.

"Written_regs" or written registers (field 66)—for a flow node, "Written_regs" are the set of registers which are written to in this node itself.

"Required_CCs" or required condition codes (field 70)—at each point during backward flow analysis, the set of condition codes which are read by some subsequent instruction. They are "required" because some previous instruction must set them.

"Required_regs" or required registers (field 72)—at each point during backward flow analysis, the set of registers which are read by some subsequent instruction, which have not yet been written by any instructions.

Note that for the "Required_CCs" and "Required_regs" the reference to "subsequent" means subsequent in the normal routine flow, not subsequent in the processing pass. "Previous" means earlier in the normal routine flow. The routine is being processed backward, so reference to "subsequent" and "previous" must be clearly kept in mind.

Referring now the FIG. 10, when Build_Flow_Graph is invoked, the selected program section, i.e., tuple stream 41, is examined, and the decision point 80 examines to see if there are more tuples in this section. If not, the procedure is exited at point 81; if so, then the next tuple is fetched as indicated by the item 82. This next tuble is examined to see if it is a label or entry point tuple, at decision point 83. If so, then the current node is ended at the previous tuple, at item 84, and this tuple is noted as starting a new node, at item 85, after which control returns to the decision point 80 via path 86. If, at decision point 83, the tuple is found not to be a label or entry point, it is examined at point 87 to see if it is an unconditional branch or return tuple. If so, the current node is ended with this tuple, as indicated by item 88, and the next tuple is noted as starting a new node, at item 89. A flow edge is created from the current node—to the branch target node—as indicated by the item 90, after which control returns to the decision point 80 via path 86. If, at decision point 87, the tuple is found to be neither an unconditional branch or a return tuple, then it is examined to see if it is a conditional branch tuple, indicated by decision point 91. If so, again the current node is ended with this tuple, as indicated by item 92, and the next tuple is noted as starting a new node, at item 93. A flow edge is created from the current node—to the new node—as indicated by the item 94. Then, a flow edge is created from the current node—to the branch target node—as indicated by the item 95, after which control returns to the decision point 80 via path 86. If, at decision point 91, a conditional branch was not found, then control returns to point 80.

Referring to FIG. 11, the procedure Analyze_Flow_Graph begins by getting the head of the routine list for the module being processed, as indicated by the item 100. Then, the list is checked to see if there are more routines in the module, at decision point 101. If so, then the procedure Traverse_Graph_Forward is called for the next routine, as indicated by the item 102; the Traverse_Graph_Forward is discussed below with reference to FIG. 12. If not, then again the head of the routine list is fetched, at item 103, and again a check is made at decision point 104 of whether there are more routines in the module. If yes, then the Traverse_Graph_Backward procedure is called for the next routine, as indicated by the item 105 of the flow chart, passing empty "Required-CCs" and "Required-regs". As indicated by the item 106, the "Output-regs" value returned by Traverse_Graph_Backward is stored as output registers for the routine. If no is the result at decision point 104, then again the head of the routine list for the module is fetched, at item 107, and a test is made to see if there are more routines in the module at point 108. If not, control returns to the calling procedure at point 109; if so, the flow graph at head of routine is fetched at item 110, and this data is examined at decision points 111, 112 and 113 to see if the "Input-regs", "Output-regs" and "Input-CCs" are non-zero. Each of these showing non-zero results in a report hint at items 114, 115 or 116 as indicated. This is done for each flow node at head of each routine, and after the last routine control returns at point 109.

Referring to FIG. 12, the Traverse_Graph_Forward routine, called from item 102 of FIG. 11, begins at item 120 by calling the Process_Forward_Node procedure of FIG. 14a, for this node. After return from the Process_Forward_Node call, for each node, a check is made at decision point 121 to see if there are any successor nodes. If not, control returns to item 102 of FIG. 11 via point 122. If so, information about the successor node is fetched at item 123, and checked to see if it has already been visited at decision point 124. If already visited, then at decision point 125 the initial stack depth of successor node ($isd_s$) is compared to a value of the final stack depth of the current node ($isd_c$); if these are equal then control returns to the item 121 via path 126, but if not the item 127 reports "run-time stack difference" message, indicating that this code point can be reached with different stack depths. If at point 124 the successor node is found not previously visited, the item 128 is entered where the initial stack depth of the successor node ($isd_s$) is set to the initial stack depth of the current node ($isd_c$) plus the total stack change in the current node. Then, the Traverse_Graph_Forward procedure is called for the successor node, at item 129. Return from Traverse_Graph_Forward passes control back to the point 121, checking for any successor nodes.

The Traverse_Graph_Backward procedure illustrated in FIG. 13 begins by calling the Process_Backward_Node procedure at item 130, passing "Required-CCs" as a parameter. Upon return from Process_Backward_Node, the item 131 is entered; in item 131 the operation is to add registers which are in "Required-regs" (but are not in the "Written-regs" set for the current node) to the "Input-regs" set for the current node. Next, at decision point 132, a check is made to see if there are any predecessor nodes. If not, the control returns to the call Traverse_Graph_Backward point, with "Output-regs" as a parameter, via point 133. If so, information for the predecessor node is fetched at item 134, and a check is made at point 135 of 7hether the predecessor node has been visited already. If already visited, a check is made at point 136 of whether the "Required-CCs" or "Required-regs" sets are different for this visit; if not control returns to point 132 to see if there are any predecessor nodes, but if so then item 137 is entered to call Traverse_Graph_Backward for the predecessor node, passing the "Input-regs" set and "Input-CCs" set as parameters. The returned "Output-regs" which are not in the "Input-regs" or "Written-regs" sets are added to the "Output-regs" set for this node, at item 138. Control is returned to the point 132 to determine if there are any predecessor nodes.

Referring to FIGS. 14a and 14b, the Process_Forward_Node procedure is illustrated in flow chart form. First, at point 140 of FIG. 14a, a check is made to see if there are more tuples in the node. If not, control is returned to the calling procedure, item 120 of FIG. 12. If so, the next tuple is fetched at item 141, and the next tuple is checked at point 142 to see if it is a register reference. If so, then the tuple is checked at points 143 and 144 to see if it is a read or write reference. If neither a read reference nor a write reference, control returns to point 140 via path 145. If the tuple is a read reference, the tuple is checked at point 146 to see if it is in the "Written-regs" set, and, if so, it is removed from the "Output-regs" set at item 147, but if not then the register is added to the "Input-regs" set at item 148. If the tuple is a write reference, then the register is added to the "Written-regs" set as item 149, and added to the "Output-regs" set at item 150, before returning to point 140 via path 145.

If, at point 142 of FIG. 14a, it is found that the tuple is not a register reference, then flow goes to the stack check beginning point 151 of FIG. 14b. The tuple is checked at point 152 to see if it indicates a stack pointer SP modification, and if so the stack pointer SP change is added to the total stack change for this node, at item 153, after which control is returned to the point 140 via path 154. If the tuple does not indicate a SP modification, then it is checked at point 155 to see if it is a stack pointer reference with offset less than $\phi$, where offset here indicates (offset specified in tuple plus the total offset at this point in the routine flow). If so, an "uplevel stack reference" error is reported at item 156, then return via path 154. If not, then the tuple is checked at point 157 to see if it is a stack pointer reference with offset equal to $\phi$; if so the tuple is checked at point 158 to see if it is a "write" reference, and if a write reference a "return address modification" error is reported at item 159, but if not a write reference then a "return address reference" error is reported at item 160, before returning via path 154 in either case. A negative result from the check at point 157 results in control passing to the check at point 161 where the tuple is examined to see if it is a return-subroutine RSB instruction. If an RSB instruction, a check is made at point 162 to see if the current stack offset plus the initial stack value is greater than $\phi$, and if so an "alternate return address on stack" error is reported at item 163, but if not then a check is made at point 164 to see if the current stack offset plus the initial stack value is less than $\phi$, in 7hich case an "uplevel return" error is reported at point 165. If the tuple is not an RSB instruction, then it is checked at point 166 to see if it is a jump-subroutine JSB instruction, in which case it is checked at point 167 to see if the JSB target is a stack pointer based location, with offset plus current stack offset plus initial stack value equal to $\phi$, in which case a co-routine call" error is reported at item 168. If none of the tests at points 152, 155, 157, 161, or 166 is positive, the stack is not involved, and control passes back to the point 140 of FIG. 14a via path 154.

The Process_Backward_Node procedure illustrated in FIG. 15 begins by checking to see if there are more tuples in the node, at point 170. If not, control returns via point 171. If so, the next tuple is fetched at item 172. Then the next tuple is examined at point 173 to determine if it represents an instruction which sets the condition codes. If so, then the condition codes which this instruction sets are removed from the "Required-CCs" set, as indicated by the item 174. A flag is set (item 175) in the tuple indicating which condition codes which were required must be realized for this instruction. If the tuple does not represent an instruction which sets condition codes, then control passes to a decision point 176 where the tuple is checked to see if it represents an instruction which reads condition codes. If so, then the condition codes which the instruction reads are added to the "Required-CCs" set at item 174. If the tuple does not represent an instruction which either sets or reads condition codes, then it is checked at point 178 to see if it represents a jump-subroutine JSB instruction, and if so then it is checked at point 179 to see if the "Required-CCs" set is empty and if not empty then a "Condition code required after JSB" error is reported at item 180. If the test at point 179 is positive, i.e., the "Required-CCs" set is empty, control returns via path 181 to the point 170. Likewise, if the tuple does not satisfy any of the tests of decision points 173, 176 or 178, control returns via path 181 to see if there are more tuples.

According to another feature of the invention, argument list references are mapped across the architectures in making the code translation in the system of FIG. 1. In translating code to a different machine architecture it is typically the case that the way argument list references are handled is different. VAX assembly language routines rely on the argument list pointer (AP) established by the VAX CALLS/CALLG instructions to refer to routine parameters. Referring to the following example of VAX code:

```
.entry rout1      ^M<R2>
                  .
                  .
                  .
                  tstl        (AP)
                  beql        lab1
                  movl        4(AP),R0
                  movl        8(AP),R2
                  .
                  .
lab1              .
                  .
```

This routine rout1 is called by, for example:

```
pushl    #1
pushl    #5
calls    #2,rout1
```

The stack thus has the literal #2 (number of arguments to be passed) at top-of-stack, and literals #1 and #5 in the next two longwords of the stack. In referencing these via the AP registerestablished by the VAX hardware for the CALLS instruction, the code with the two movl instructions moves the first two longwords from the stack to R0 and R2.

In contrast, on an advanced 64-bit RISC machine, there is no architected argument list pointer (AP), and the calling standard dictates that parameters are passed in registers, or, if necessary, on top of the stack. A RISC machine has a large number of registers, e.g., thirty-two 64-bit registers, and these are used in passing arguments, instead of memory references to stack as VAX uses. For example, the argument information may be designated to be in register-25 (R25), and R16–R21 used for arguments. Then, if there are more than six arguments to be passed, the calling routine leaves the remainder of the arguments on top of the stack. Thus, an example of code to set up for a jump to a subroutine for this type of machine, assuming there are eight arguments, is as follows:

```
LDQ      R16,arg1
LDQ      R17,arg2
         .
         .
         .
LDQ      R21,arg6
SUBQ     SP,#16,SP
STQ      R5.8(SP)
STQ      R6,0(SP)
```

-continued

```
JSR          R28,R24
```

The code translator, according to another feature of one embodiment of the invention, resolves this differences in the way argument lists are passed, without requiring all argument list references to be modified by hand by the user through editing the source code.

The compiler examines all AP-based memory references in the input code to determine how the same argument reference may be made in the target environment. Element 0 of the argument list vector represents the argument count on VAX; in the target RISC architecture, the argument count appears in a defined register, e.g., the Argument Information Register (R25). Hence, in this instance, a memory reference of the form 0(AP) will be compiled to an R25 reference. The first six arguments are received in registers R16-R21 on in the target RISC architecture, so that 4(AP) will be compiled to use R16, 8(AP) to use R17, etc.

If there are variable offsets for the arguments in the VAX code, other steps must be taken. For example, if the VAX code is of the form

```
MOVL         4(AP)[R0],R1
``` so that a run-time indexed reference is made, it is necessary to make a different translation. In this case, the compiler mimics VAX argument lists by packing the quadword register and stack arguments into a longword argument list on the stack. This is referred to as argument list "homing", and occurs if the compiler detects any AP uses which may result in aliased references to the argument list, any AP references with variable indices, or any non-longword aligned AP offsets. In this case, argument list references are compiled into FP (frame pointer) based references to the homed list, which is built by code generated for the routine entry point.

Thus, when a CALLS (call subroutine) instruction is encountered in the input VAX code, the storage allocator 27 of the compiler generates code to copy arguments from the stack, where they have been placed by the original source code, into the RISC argument registers. If there are more than six arguments (requiring more than R16-R21), the seventh and beyond must be copied to consecutive aligned 64-bit slots on top of the stack. The argument information register R25 receives the argument count, which, on VAX, would have been at 0(FP). Corresponding code to clean the stack after the called routine returns is also generated.

Figure 16:
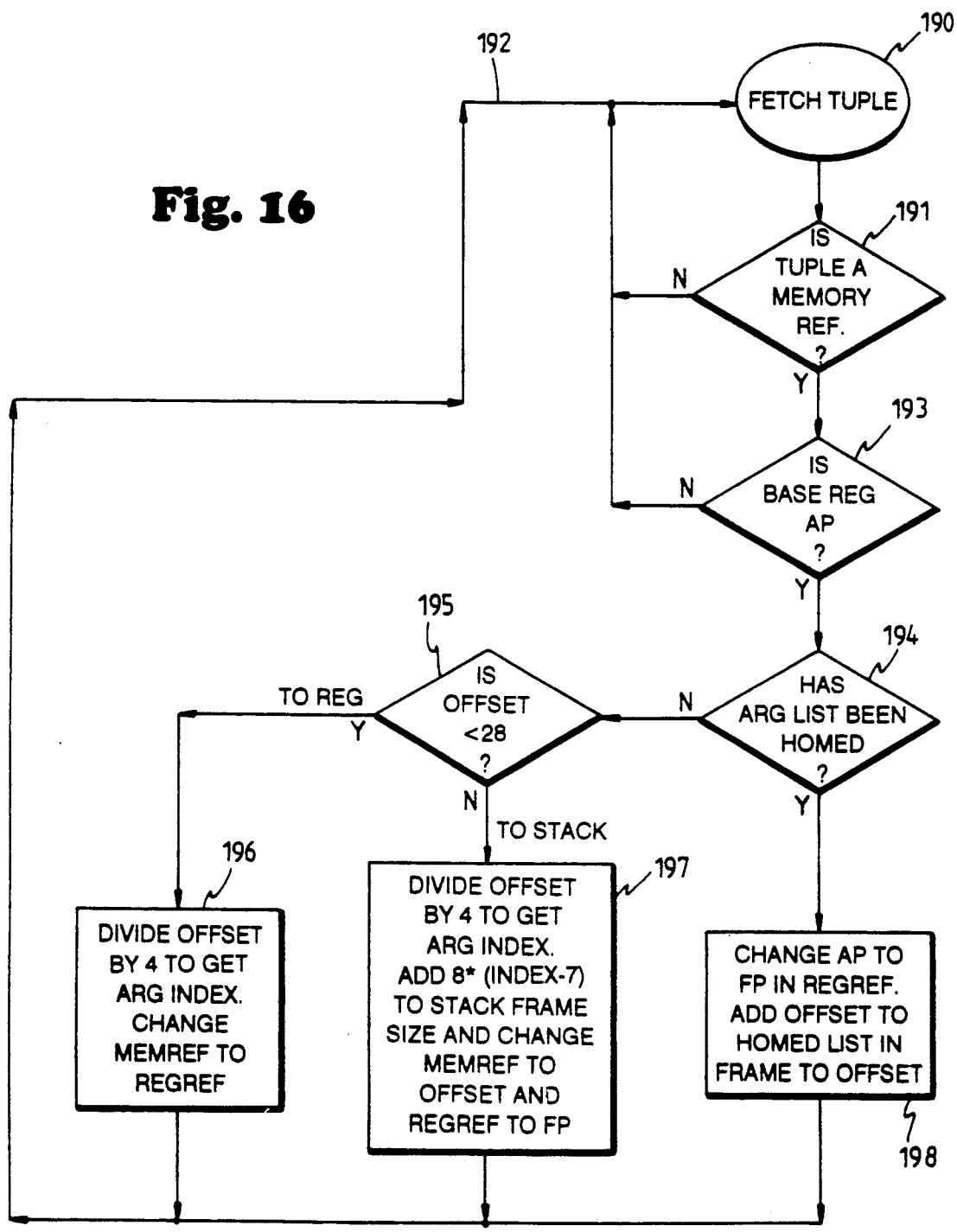
FIG. 16 is a logic flow chart of a procedure used for mapping argument list references in translating code to another machine architecture, used in the method of one feature of the invention, according to one embodiment.

Referring to FIG. 16, a logic flow chart of a procedure used in the storage allocation phase for mapping argument list references in translating VAX code to advanced 64-bit RISC machine architecture is illustrated, as used in the method of one feature of the invention, according to one embodiment. A tuple is fetched at item 190, and examined to see if it is a memref at decision point 191. If not, the control returns via path 192. If so, it memref is checked to see if the base register is AP at point 193, and if so, checked at point 194 to see if the argument list has been homed; if not then checked at point 195 to see if the offset is <28 (meaning the number of longword is less than seven). When the result at point 195 is yes, this means the argument is going to a register location, so at item the offset is divided by four to get the argument index in the registers R17 to R21, and the memory reference is changed to a register reference. If the result at point 195 is no, that means the argument is to be in the stack frame, so in item 197 the offset is divided by four to get the argument index, and 8*index is added to the stack frame size; also the memory reference is changed to an offset and the register reference is changed to the frame pointer. If it is found in decision point 194 that the argument list has been homed, then the operation in item 198 is to change the argument pointer AP to a frame pointer FP in the register reference, and add the offset to the homed list in the frame, to the offset.

While this invention has been described with reference to specific embodiments, this description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments as fall within the true scope of the invention.

APPENDIX A

```
00000000    1
00000000   22    Test:  .jsb_entry
                1724864: jsb_entry    (1,1) next:1724936,    prev:1726016,    flags: 0
                                      Name: TEST
00000000   23           pushl   r0
                1724936: regref       (1,9) next:1724896,    prev:1724864,    flags: 0
                                      Register: R0, read, unaligned
                1724896: instr        (1,1) next:1725024,    prev:1724936,    flags: 0
                                      Opcode: 227, allocated operands: 1
                                      Regs Used: none
                                      Op 1: 1724936
00000002   24           beql    lab2
                1725024: symref       (1,2) next:1724976,    prev:1724896,    flags: 0
                                      Name: LAB2  Use count: 1
                                      Access: unspecified
                1724976: condbr       (1,1) next:1725112,    prev:1725024,    flags: 0
                                      Opcode: 20, Regs Used: none
                                      Op 1: 1725024
00000004   25           addl3   r1, r2, -(sp)
                1725112: regref       (1,9) next:1725152,    prev:1724976,    flags: 0
                                      Register: R1, read, unaligned
                1725152: regref       (1,9) next:1725232,    prev:1725112,    flags: 0
                                      Register: R2, read, unaligned
                1725232: regref       (1,2) next:1725192,    prev:1725152,    flags: 0
                                      Register: SP, read, unaligned
```

```
             1725192: memref    (2,9) next:1725064,  prev:1725232,   flags: 4
                                Access: write autodec   Use count: 1
                                Op 1: 1725232
             1725064: instr     (1,1) next:1725320,  prev:1725192,   flags: 0
                                Opcode: 198,  allocated operands: 3
                                Regs Used: none
                                Op 1: 1725112
                                Op 2: 1725152
                                Op 3: 1725192
00000008   26       blss    lab1
             1725320: symref    (1,2) next:1725272,  prev:1725064,   flags: 0
                                Name: LAB1   Use count: 1
                                Access: unspecified
             1725272: condbr    (1,1) next:1725440,  prev:1725320,   flags: 0
                                Opcode: 27, Regs Used: none
                                Op 1: 1725320
0000000A   27       movl    (sp)+, r3
             1725440: regref    (1,2) next:1725400,  prev:1725272,   flags: 0
                                Register: SP, read, unaligned
             1725400: memref    (2,9) next:1725480,  prev:1725440,   flags  2
                                Access: read autoinc   Use count: 1
                                Op 1: 1725440
             1725480: fetch     (9,9) next:1725520,  prev:1725400,   flags: 0
                                Op 1: 1725400
             1725520: regref    (1,9) next:1725360,  prev:1725480,   flags: 0
                                Register: R3, write, unaligned
             1725360: instr     (1,1) next:1725600,  prev:1725520,   flags: 0
                                Opcode: 213,  allocated operands: 2
                                Regs Used: none
                                Op 1: 1725480
                                Op 2: 1725520
0000000D   28       brb     lab2
             1725600: symref    (1,2) next:1725560,  prev:1725360,   flags: 0
                                Name: LAB2   Use count: 1
                                Access: unspecified
             1725560: branch    (1,1) next:1725680,  prev:1725600,   flags: 0
                                Op 1: 1725600
0000000F   29  lab1: addl2   #4, sp
             1725680: label     (1,1) next:1725712,  prev:1725560,   flags: 0
                                Name: LAB1
             1725712: litref    (5,9) next:1725744,  prev:1725680,   flags: 0
                                Literal Value: 4
             1725744: regref    (1,9) next:1725640,  prev:1725712,   flags: 0
                                Register: SP, read/write, unaligned
             1725640: instr     (1,1) next:1725944,  prev:1725744,   flags: 0
                                Opcode: 197,  allocated operands: 2
                                Regs Used: none
                                Op 1: 1725712
                                Op 2: 1725744
00000012   30  lab2: popl    r5
             1725944: label     (1,1) next:1725864,  prev:1725640,   flags: 0
                                Name: LAB2
             1725864: regref    (1,2) next:1725824,  prev:1725944,   flags: 0
                                Register: SP, read, unaligned
             1725824: memref    (2,9) next:1725904,  prev:1725864,   flags: 2
                                Access: read autoinc   Use count: 1
                                Op 1: 1725864
             1725904: fetch     (9,9) next:1725976,  prev:1725824,   flags: 0
                                Op 1: 1725824
             1725976: regref    (1,9) next:1725784,  prev:1725904,   flags: 0
                                Register: R5, write, unaligned
             1725784: instr     (1,1) next:1726016,  prev:1725976,   flags: 0
                                Opcode: 213,  allocated operands: 2
                                Regs Used: none
                                Op 1: 1725904
                                Op 2: 1725976
00000015   31       rsb
             1726016: rsb       (1,1) next:1724864,  prev:1725784,   flags: 0
```

APPENDIX B

```
******* NODE 4 - address: 1720120    start: 1724864  end:1725600 ********
        routine: TEST (lexically: TEST)
        1 predecessors: 1
        1 successors: 5  (depth first: 5)
        Initial Stack Depth: 0, Stack Change: 0
        Input Registers: 0-2
        Written Registers: none 1724864: jsb_entry   (1,1) next:1725024,        prev:1726016,   flags: 0
                     Name: TEST
1725024: symref      (1,2) next:1726360, prev:1724864,   flags: 4
                     Name: LAB2   Use count: 1
                     Access: unspecified
1726360: regref      (1,2) next:1726240, prev:1725024,   flags: 0
                     Register: SP, read, unaligned
```

```
1726240: memref    (2,9) next:1726320, prev:1726360,    flags: 2
                   Access: read/write autoinc   Use count: 1
                   Op 1: 1726360
1726320: regref    (1,2) next:1726200, prev:1726240,    flags: 0
                   Register: SP, read, unaligned
1726200: memref    (2,9) next:1725320, prev:1726320,    flags: 4
                   Access: write autodec   Use count: 1
                   Op 1: 1726320
1725320: symref    (1,2) next:1726280, prev:1726200,    flags: 4
                   Name: LAB1   Use count: 1
                   Access: unspecified
1726280: regref    (1,2) next:1725232, prev:1725320,    flags: 0
                   Register: SP, read, unaligned
1725232: memref    (2,9) next:1725600, prev:1726280,    flags: 2
                   Access: read/write autoinc   Use count: 1
                   Op 1: 1726280
1725600: symref    (1,2) next:1726048, prev:1725232,    flags: 4
                   Name: LAB2   Use count: 1
                   Access: unspecified

******** NODE 5 - address: 1720328    start: 1726048  end:1724976 ********
         routine: TEST (lexically: TEST)
         1 predecessors:  4
         2 successors:  6 9  (depth first: 6)
         Initial Stack Depth: 0, Stack Change: 4
         Input Registers:  0-2, 29-30
         Written Registers:  none
         CCs used: VNZ 1726048: label     (0,0) next:1724936, prev:1725600,    flags: 0
                   Name: $L1
1724936: regref    (1,9) next:1724896, prev:1726048,    flags: 20
                   Register: R0, read, aligned
1724896: instr     (1,1) next:1724976, prev:1724936,    flags: c
                   Instruction flags: set_nz local_nz
                   Opcode: 227, allocated operands: 1
                   Regs Used: 0
                   Op 1: 1724936
1724976: condbr    (1,1) next:1725112, prev:1724896,    flags: 0
                   Opcode: 20, Regs Used: none
                   Op 1: 1725024

******** NODE 6 - address: 1720792    start: 1725112  end:1725272 ********
         routine: TEST (lexically: TEST)
         1 predecessors:  5
         2 successors:  7 8  (depth first: 8)
         Initial Stack Depth: 4, Stack Change: 4
         Input Registers:  1-2, 29-30
         Written Registers:  none
         CCs used: CVNZ 1725112: regref    (1,9) next:1725152, prev:1724976,    flags: 20
                   Register: R1, read, aligned
1725152: regref    (1,9) next:1725064, prev:1725112,    flags: 20
                   Register: R2, read, aligned
1725064: instr     (1,1) next:1725272, prev:1725152,    flags: c
                   Instruction flags: set_nz local_nz
                   Opcode: 198, allocated operands: 3
                   Regs Used: 1-2, 30
                   Op 1: 1725112
                   Op 2: 1725152
                   Op 3: 1726200
1725272: condbr    (1,1) next:1725480, prev:1725064,    flags: 0
                   Opcode: 27, Regs Used: none
                   Op 1: 1725320

******** NODE 7 - address: 1720944    start: 1725480  end:1725560 ********
         routine: TEST (lexically: TEST)
         1 predecessors:  6
         1 successors:  9  (depth first: 9)
         Initial Stack Depth: 8, Stack Change: -4
         Input Registers:  29-30
         Written Registers:  3
         CCs used: VNZ 1725480: fetch     (9,9) next:1725520, prev:1725272,    flags: 0
                   Op 1: 1725232
1725520: regref    (1,9) next:1725360, prev:1725480,    flags: 20
                   Register: R3, write, aligned
1725360: instr     (1,1) next:1725560, prev:1725520,    flags: 0
                   Opcode: 213, allocated operands: 2
                   Regs Used: 3, 30
                   Op 1: 1725480
                   Op 2: 1725520
1725560: branch    (1,1) next:1725680, prev:1725360,    flags: 0
                   Op 1: 1725600
```

```
******** NODE 8 - address: 1720536      start: 1725680  end:1725640 ********
         routine: TEST (lexically: TEST)
         1 predecessors:  6
         2 successors:  8 9  (depth first: 7)
         Initial Stack Depth: 8, Stack Change: -4
         Input Registers:  29-30
         Written Registers:  30
         CCs used: CVNZ 1725680: label    (1,1) next:1725712,   prev:1725560,   flags: 0
                  Name: LAB1
1725712: litref   (5,9) next:1725744,   prev:1725680,   flags: 0
                  Literal Value: 4
1725744: regref   (1,9) next:1725640,   prev:1725712,   flags: 4
                  Register: SP, read/write, unaligned
1725640: instr    (1,1) next:1725944,   prev:1725744,   flags: 0
                  Opcode: 197,  allocated operands: 2
                  Regs Used: 30
                  Op 1: 1725712
                  Op 2: 1725744

******** NODE 9 - address: 1720640      start: 1725944  end:1726016 ********
         routine: TEST (lexically: TEST)
         3 predecessors:  8 7 5
         1 successors:  0
         Initial Stack Depth: 4, Stack Change: -4
         Input Registers:  29-30
         Written Registers:  5
         CCs used: VNZ 1725944: label    (1,1) next:1725904,   prev:1725640,   flags: 0
                  Name: LAB2
1725904: fetch    (9,9) next:1725976,   prev:1725944,   flags: 0
                  Op 1: 1726240
1725976: regref   (1,9) next:1725784,   prev:1725904,   flags: 20
                  Register: R5, write, aligned
1725784: instr    (1,1) next:1726016,   prev:1725976,   flags: 0
                  Opcode: 213,  allocated operands: 2
                  Regs Used: 5, 30
                  Op 1: 1725904
                  Op 2: 1725976
1726016: rsb      (1,1) next:1724864,   prev:1725784,   flags: 0

-------------- END PSECT . BLANK . --------------

.end
```

APPENDIX C

```
23DEFFE0  0000          TEST:  LDA   SP, -32(SP)      ; 000022
B75E0000  0004                 STQ   R26, (SP)
B47E0008  0008                 STQ   R3, 8(SP)
B4BE0010  000C                 STQ   R5, 16(SP)
B5BE0018  0010                 STQ   R13, 24(SP)
47FB040D  0014                 MOV   R27, R13

43C0913E  0018          $L1:   SUBL  SP, 4, SP        ; 000023
B01E0000  001C                 STL   R0, (SP)
E4000009  0020                 BEQ   R0, LAB2         ; 000024
43C0913E  0024                 SUBL  SP, 4, SP        ; 000025
4022081C  0028                 ADDL  R1, R2, R28
B39E0000  002C                 STL   R28, (SP)
EB00 0004 0030                 BLT   R28, LAB1
47FE041C  0034                 MOV   SP, R28          ; 000026
A07C0000  0038                 LDL   R3, (R28)
43C0901E  003C                 ADDL  SP, 4, SP
C3E00001  0040                 BR    LAB2             ; 000027

43C0901E  0044          LAB1:  ADDL  SP, 4, SP        ; 000028

47FE041C  0048          LAB2:  MOV   SP, R28          ; 000029
A0BC0000  004C                 LDL   R5, (R28)
43C0901E  0050                 ADDL  SP, 4, SP

A79E0000  0054          $L2:   LDQ   R28, (SP)        ; 000030
A47E0008  0058                 LDQ   R3, 8(SP)
A4BE0010  005C                 LDQ   R5, 16(SP)
A5BE0018  0060                 LDQ   R13, 24(SP)
23DE0020  0064                 LDA   SP, 32(SP)       ; 000031
6BFC8000  0068                 RET   R28              ; 000022
```

APPENDIX D

```
00000000        1    test: .jsb_entry
00000000       22
                1
```
%AMAC-E-CONDZIN, (1) Condition code Z expected as input to routine TEST %AMAC-I-HINTRTN, (1) Compiler Hint: Possible Input Registers: R0 in routine TEST %AMAC-I-HINTRTN, (1) Compiler Hint: Possible Output Registers: R0 R3 in routine TEST %AMAC-I-HINTRTN, (1) Compiler Hint: Auto-Preserved Registers: R3 in routine TEST

```
00000000       23          beql    lab1         ; Relies on a CC as input
00000002       24          movl    r0, r3       ; R0 is an input register; r3 is considered
00000005       25                                ; output since it is not subsequently read
00000005       26
00000005       27
00000005       28          movl    20(sp), r0   ; An uplevel stack reference
                1........
```
%AMAC-E-UPLEVSTK, (1) Up-level stack reference in routine TEST

```
00000009       29
00000009       30          jsb     @(sp)        ; A co-routine call back to caller
                1........
```
%AMAC-E-COROUTCALL, (1) Co-routine call in routine TEST

```
0000000C       31
0000000C       32          beql    lab2         ; Relies on CC returned from JSB routine
0000000E       33
0000000E       34          pushal  extern_label ; Attempts to change the return address on
00000014       35                                ; the stack
00000014       36          rsb
                1........
```
%AMAC-E-CONDZAFT, (1) Condition code Z expected after JSB in routine TEST

```
00000015       37
00000015       38  lab1:   pushl   r0           ; In this path, an extra longword is pushed
00000017       39  lab2:   rsb                  ; so stack depth is unpredictable here.
                1........
```
%AMAC-E-ALTRETADDR, (1) Alternate return address on stack in routine TEST

```
00000018       40
00000018       41          .end
```
%AMAC-I-RUNTIMSTK, (1) Run time stack differences prevent accurate stack tracing

What is claimed is:

1. A method executed by a computer for translating first computer code written for a first computer architecture to second computer code for a second computer architecture, wherein said first computer architecture uses a stack referenced by an argument pointer to pass arguments in procedure calls, and wherein said second computer architecture uses registers to pass arguments in procedure calls, comprising the steps of:

accessing said first computer code and converting it to generate a flow graph in an intermediate language from said first computer code, the flow graph being composed of blocks, and the blocks being composed of intermediate-language elements, where each element represents a single expression in said code, and where each block represents a sequence of one or more elements;

tracing said elements by sequentially examining said elements to find a first element corresponding to a memory reference defined by said argument pointer and an offset to an argument, changing said offset in said first element to an index giving the number of said argument, changing said memory reference of said first element to a register reference;

compiling said flow graph by accessing said elements and generating said second computer code to produce object code for said second computer architecture.

2. A method according to claim 1 wherein said stack may be of any size and said registers to pass arguments are of a fixed number.

3. A method according to claim 2 wherein, if the number of arguments is greater than said fixed number, then for a second element having an offset representing greater than said fixed number adding to said second element a stack frame referenced by a frame pointer to pass an argument represented by said offset.

4. A method according to claim 3 including the step of adding to said second element a frame offset from said offset and adding to said second element a memory reference using said frame pointer and said frame offset.

5. A method according to claim 1 wherein each of said blocks begins with an entry and ends in a branch or return with no intermediate entry.

6. A method according to claim 1 wherein said elements are tuples.

7. A method executed by a computer for translating first computer code written for a first computer architecture to code for a second computer architecture, wherein said first computer architecture uses a stack referenced by an argument pointer to pass arguments in call instructions, and wherein said second computer architecture uses registers to pass arguments in call instructions, comprising the steps of:

tracing a representation of said code by sequentially examining said representation to find a memory reference for a call instruction defined by said argument pointer and an offset to an argument, changing said offset to an index giving the number of said argument, changing said memory reference to a register reference; and thereafter compiling said representation by accessing said representation and generating object code to produce said second computer code for said second computer architecture.

8. A method according to claim 7 wherein said stack may be of any size and said registers to pass arguments are of a fixed number.

9. A method according to claim 8 wherein, if the number of arguments is greater than said fixed number, then for an element of said representation having an offset representing greater than said fixed number adding to said element a stack frame referenced by a frame pointer to pass an argument represented by said offset.

10. A method according to claim 9 including the step of adding to said element a frame offset from said offset and adding to said element a memory reference using said frame pointer and said frame offset.

11. Computer apparatus for translating first computer code written for a first computer architecture to second computer code for a second computer architecture, wherein said first computer architecture uses a stack referenced by an argument pointer to pass arguments in procedure calls, and wherein said second computer architecture uses registers to pass arguments in procedure calls, comprising:

means for accessing said first computer code to generate a flow graph in an intermediate language from said first computer code, the flow graph being composed of blocks, and the blocks being composed of intermediate language elements, where each element represents a single expression in said code, and where each block represents a sequence of one or more intermediate language elements;

means for reading said elements of said flow graph to find an element corresponding to a memory reference defined by said argument pointer and an offset to an argument, means for changing said offset to an index giving the number of said argument, means for changing said memory reference to a register reference;

compiling means for accessing said flow graph to produce said second computer code in the form of object code for said second machine architecture.

12. Apparatus according to claim 11 wherein said stack may be of any size and said registers to pass arguments are of a fixed number.

13. Apparatus according to claim 12 wherein, if the number of arguments is greater than said fixed number, then for a second element having an offset representing greater than said fixed number adding to said second element a stack frame referenced by a frame pointer to pass an argument represented by said offset.

14. Apparatus according to claim 13 including the step of adding to said second element a frame offset from said offset and adding to said second element a memory reference using said frame pointer and said frame offset.

15. Apparatus according to claim 11 wherein each of said blocks begins with an entry and ends in a branch or return with no intermediate entry.

16. Apparatus according to claim 11 wherein said elements are tuples.

* * * * *

UNITED STATES PATENT AND TRADEMARK OFFICE
CERTIFICATE OF CORRECTION

PATENT NO. : 5,307,492
DATED : April 26, 1994
INVENTOR(S) : Thomas R. Benson

It is certified that error appears in the above-indentified patent and that said Letters Patent is hereby corrected as shown below:

Column 1, line 65, "/pcodes" should be --opcodes--

Column 3, line 42, "/perations" should be --operations--

Column 6, line 34, "7alk" should be --walk--

Column 11, line 31, "/perands" should be --operands--

Column 13, line 60, remove "."

Column 18, line 41, "7hether" should be --whether--

Column 19, line 34, "7hich" should be --which--

Column 21, lines 6-7, "differences" should be "difference"

Signed and Sealed this

Twenty-seventh Day of September, 1994

Attest:

BRUCE LEHMAN

Attesting Officer

Commissioner of Patents and Trademarks